(12) United States Patent
Angell et al.

(10) Patent No.: US 7,833,666 B2
(45) Date of Patent: Nov. 16, 2010

(54) ELECTRIC CURRENT-PRODUCING DEVICE HAVING SULFONE-BASED ELECTROLYTE

(75) Inventors: Charles Austen Angell, Mesa, AZ (US); Xiao-Guang Sun, Tempe, AZ (US)

(73) Assignee: Arizona Board of Regents for and behalf of Arizona State University, Scottsdale, AZ (US)

( * ) Notice: Subject to any disclaimer, the term of this patent is extended or adjusted under 35 U.S.C. 154(b) by 372 days.

(21) Appl. No.: 11/780,416

(22) Filed: Jul. 19, 2007

(65) Prior Publication Data

US 2007/0298326 A1    Dec. 27, 2007

Related U.S. Application Data

(63) Continuation of application No. PCT/US2006/001975, filed on Jan. 19, 2006.

(60) Provisional application No. 60/645,536, filed on Jan. 19, 2005.

(51) Int. Cl.
*H01M 6/16* (2006.01)
*H01M 10/0569* (2006.01)

(52) U.S. Cl. .................. 429/340; 429/341; 429/324; 429/321; 568/32; 568/35

(58) Field of Classification Search .................. None
See application file for complete search history.

(56) References Cited

U.S. PATENT DOCUMENTS

| | | | |
|---|---|---|---|
| 3,185,590 | A | 5/1965 | Mayer |
| 3,532,543 | A | 10/1970 | Nole et al. |
| 3,578,500 | A | 5/1971 | Maricle et al. |

(Continued)

FOREIGN PATENT DOCUMENTS

FR    2516920    5/1983

(Continued)

OTHER PUBLICATIONS

Bach, S. and N. Baffler, "Rechargeable γ-$MnO_2$ for lithium batteries using a sulfone-based electrolyte at 150 °C," J. Power Sources 43-44:569-575 (1993).

(Continued)

*Primary Examiner*—Keith Walker
(74) *Attorney, Agent, or Firm*—Fish & Richardson P.C.

(57) ABSTRACT

Electrolytic solvents and applications of such solvents including electric current-producing devices. For example, a solvent can include a sulfone compound of R1—SO2—R2, with R1 being an alkyl group and R2 a partially oxygenated alkyl group, to exhibit high chemical and thermal stability and high oxidation resistance. For another example, a battery can include, between an anode and a cathode, an electrolyte which includes ionic electrolyte salts and a non-aqueous electrolyte solvent which includes a non-symmetrical, non-cyclic sulfone. The sulfone has a formula of R1—SO2—R2, wherein R1 is a linear or branched alkyl or partially or fully fluorinated linear or branched alkyl group having 1 to 7 carbon atoms, and R2 is a linear or branched or partially or fully fluorinated linear or branched oxygen containing alkyl group having 1 to 7 carbon atoms. The electrolyte can include an electrolyte co-solvent and an electrolyte additive for protective layer formation.

32 Claims, 16 Drawing Sheets

U.S. PATENT DOCUMENTS

| | | | |
|---|---|---|---|
| 3,778,310 | A | 12/1973 | Garth |
| 3,877,983 | A | 4/1975 | Hovsepian |
| 4,118,550 | A | 10/1978 | Koch |
| 4,163,829 | A | 8/1979 | Kronenberg |
| 4,252,876 | A | 2/1981 | Koch |
| 4,499,161 | A | 2/1985 | Foos |
| 4,528,254 | A * | 7/1985 | Wolf et al. ............... 429/336 |
| 4,740,436 | A | 4/1988 | Kobayashi et al. |
| 4,833,048 | A | 5/1989 | Dejonghe |
| 4,917,974 | A | 4/1990 | DeJonghe |
| 5,079,109 | A | 1/1992 | Takami |
| 5,324,599 | A | 6/1994 | Oyama |
| 5,432,425 | A | 7/1995 | Lundquist |
| 5,436,549 | A | 7/1995 | Lundquist |
| 5,441,831 | A | 8/1995 | Okamoto |
| 5,460,905 | A | 10/1995 | Skotheim |
| 5,462,566 | A | 10/1995 | Skotheim |
| 5,516,598 | A | 5/1996 | Visco |
| 5,529,860 | A | 6/1996 | Skotheim |
| 5,582,623 | A | 12/1996 | Chu |
| 5,587,253 | A | 12/1996 | Gozdz |
| 5,601,947 | A | 2/1997 | Skotheim |
| 6,245,465 | B1 * | 6/2001 | Angell et al. ............... 429/340 |
| 7,026,075 | B2 | 4/2006 | Takami et al. |
| 7,223,502 | B2 | 5/2007 | Onuki |
| 7,465,834 | B2 | 12/2008 | Sueto et al. |
| 2005/0051752 | A1 | 3/2005 | Sievert et al. |
| 2006/0292452 | A1 * | 12/2006 | Utsugi et al. ............... 429/340 |
| 2007/0048605 | A1 | 3/2007 | Pez et al. |

FOREIGN PATENT DOCUMENTS

| | | |
|---|---|---|
| GB | 1 189 561 | 4/1970 |
| JP | 09-147913 | 6/1997 |
| JP | 2006206457 A | 8/2006 |
| JP | 2006236829 A | 9/2006 |
| JP | 2007005267 A | 1/2007 |
| JP | 2007109591 A | 4/2007 |
| KR | 2007034967 A | 3/2007 |
| WO | WO 99/19932 | 4/1999 |
| WO | WO02076924 A1 | 10/2002 |
| WO | WO01093363 A3 | 1/2003 |
| WO | WO03106419 A1 | 12/2003 |
| WO | WO2004082059 A1 | 9/2004 |
| WO | WO2005063773 A1 | 7/2005 |
| WO | WO2005109562 A1 | 11/2005 |
| WO | WO2006017898 A1 | 2/2006 |
| WO | WO 2006/078866 | 7/2006 |
| WO | WO2006104305 A1 | 10/2006 |
| WO | WO2005121413 A3 | 5/2007 |
| WO | WO2006078866 A3 | 4/2009 |

OTHER PUBLICATIONS

Derwent English language abstract for French Patent No., FR 2516920, published May 27, 1983, entitled "Fluorinated sulphide, sulphoxide and sulphone cpds. useful as gas vehicles and blood substitutes". Derwent Accession No. 1983-61806K, 1 page.

English language abstract for Japanese Patent No. JP9147913, published Jun. 6, 1997, entitled "Nonaqueous Electrolyte Battery" Source: http://gb.epacenet.com [accessed Aug. 29, 2008], 1 page.

Giwa, C.O., "Feasibility study of sulfone-based electrolytes for a medium-temperature reserve cell concept,"IEEE 35th International Power Sources Symposium pp. 215-218 (1992).

Giwa, "Feasibility study of sulfone-based electrolytes for a medium-temperature reserve cell concept," J Power Sources 42:389-397 (1993).

Gokel, G. W. et al., "Sulfur Heterocycles, 3. Heterogeneous, Phase-Transfer, and Acid-Catalyzed Potassium Permanganate Oxidaton of Sulfides to Sulfones and a Survery of their Carbon-13 Nuclear Magnetic Resonance Spectra" J. Org. Chem., 45:3634-3639 (1980).

Lu, Z., et al., "Can All the Lithium be Removed from T2-$Li_{2,3}[Ni_{1/3}Mn_{2/3}]O_2$?" J. Electrochem. Soc. 148:A710-A715 (2001).

Lucas, P., et al., "Synthesis and Diagnostic Electrochemistry of Nanocrystalline $Li_{1+x}Mn_{2-x}O_4$ Powders of Controlled Li Content," J. Electrochem Soc. 147: 4459-4463 (2000).

Pereira-Ramos et al., "Sulfone-based electrolytes for lithium Intercalation batteries," J. Power Sources 16:193-204 (1985).

Robertson, A. D., et al., "$M^{3+}$-Modified $LiMn_2O_4$ Spinel Intercalation Cathodes, Electrochemical Stabilization by $Cr^{3+}$," J. Electrochem. Soc., 144: 3505-3512 (1997).

Seel, J. A. et al., "Electrochemical Intercalation of $PF_6$ into Graphite," J. Electrochem. Soc. 147: 892-898 (2000).

Sigala, C., et al., "Influence of the Cr Content on the Electrochemical Behavior of the $LiCr_yMn_{2-y}O_4$ ($0 \leq \gamma \leq 1$) Compounds III. Galvanostatic Study of Bulk and Superficial Processes," J. Electrochem. Soc., 148: A826-A832 (2001).

Sun, X. G. and C.A. Angell, "New sulfone electrolytes for rechargeable lithium batteries. Part I. Oligoether-containing sulfones," Electrochemistry Communications 7: 261-266 (2005).

Sun, X. G. and C. A. Angell, "New sulfone electrolytes, Part II. Cyclo alkyl group containing sulfones," Solid State Ionics, 175: 257-260 (2004).

Sun, X. G., "Synthesis and Characterization of Liquid and Polymer Electrolytes for Rechargeable Lithium Batteries," Ph.D Thesis, Arizona State University, (188 pp.) 2001.

Xu, K., "Nonaqueous Liquid Electrolytes for Lithium-Based Rechargeable Batteries," Chem. Rev., 104: 4303-4417 (2004).

Xu, K. and C.A. Angell, "High Anodic Stability of a New Electrolyte Solvent: Unsymmetric Noncyclic Aliphatic Sulfone," J. Electrochem. Soc., 145(4): L70-L72 (Apr. 1998).

Xu, K. and C. A. Angell, "Sulfone-Based Electrolytes for Lithium-Ion Batteries," J. Electrochem. Soc., 149: A920-A926 (2002).

Xu, W., et al., "Structures of Orthoborate Anions and Physical Properties of Their Lithium Salt Nonaqueous Solutions," J. Electrochem. Soc. 150: E74-E80 (2003).

Yoshio, M., et al., "Storage and cycling performance of Cr-modified spinel at elevated temperatures," J. Power Sources, 101: 79-85 (2001).

Egashira et al., "The preparation of quaternary ammonium-based ionic liquid containing a cyano group and its properties in a lithium battery electrolyte", J. Power Sources 138, pp. 240-244; 2004.

Felton et al, Efficient electrocatalytic addition reactions of allyl phenyl sulfone to electron deficient alkenes, Tetrahedron 61, pp. 3515-3523; 2005.

English Language Abstract for Japanese Patent No. JP2006236829 published Sep. 9, 2007, entitled "Ionic Liquid, Nonaqueous Electrolyte for Electricity Accumulation Device and Electricity Accumulation Device", Source: http://gb.espacenet.com, 1 page.

English Language Abstract for Japanese Patent No. JP2007005267A published Jan. 11, 2007, entitled "Lithium Ion Secondary Battery Using Ordinary Temperature Molten Salt and its Manufacturing Method", Source: http://gb.espacenet.com, 1 page.

English Language Abstract for Japanese Patent No. JP2006206457 published Aug. 10, 2006, entitled "Molten Cyclic Ammonium Salt and Use Thereof", 1 page.

English Language Abstract for Japanese Patent No. JP2007109591A published Apr. 26, 2007, entitled "Lithium Secondary Battery", Source: http://gb.espacenet.com, 1 page.

* cited by examiner

ELECTRIC CURRENT-PRODUCING DEVICE HAVING SULFONE-BASED ELECTROLYTE

PRIORITY CLAIMS

The present non-provisional patent application is, under 35 U.S.C. §120, a continuing patent application of and claims priority to a co-pending PCT Application No. PCT/US2006/001975 entitled "ELECTRIC CURRENT-PRODUCING DEVICE HAVING SULFONE-BASED ELECTROLYTE" and filed on Jan. 19, 2006 (PCT Publication No. WO2006078866(A2)) which, under 35 U.S.C. §119(e)(1), claims priority to a U.S. provisional application Ser. No. 60/645,536 entitled "New Sulfone Electrolytes for Rechargeable Lithium Batteries" and filed on Jan. 19, 2005 by Xiao-Guang Sun et al.

The above referenced prior patent applications are incorporated by reference in their entirety as part of the specification of the present application.

STATEMENT REGARDING FEDERALLY-SPONSORED RESEARCH OR DEVELOPMENT

The U.S. Government has a paid-up license in the present invention and the right in limited circumstances to require the patent owner to license others on fair and reasonable terms as provided by the terms of Grant No. DEFG039ER14378-003 and DEFG03945541 awarded by the U.S. Department of Energy.

TECHNICAL FIELD

The present specification relates to electric current-producing devices and techniques including non-aqueous electrolyte solvents for use in electric current-producing devices.

BACKGROUND

Batteries are commonly used to power many types of motors and electronic devices for use in portable applications. The battery may be rechargeable or disposable (one-shot usage) type. The battery provides operating power for integrated circuits in portable electronic systems, or provides an electromotive force to drive motors for industrial applications.

One area of particular interest is automotive power trains. Battery-powered automobiles offer many interesting possibilities for fulfilling transportation needs, while reducing energy consumption, and minimizing hazard to the environment. Automobile batteries must be rechargeable and preferably deliver high voltages, e.g. greater than 4.5 VDC, to provide adequate power to the motor. The battery should also have good electrochemical stability, safety and longevity.

Common types of rechargeable battery are known as lithium-ion cell and lithium metal cell. U.S. Pat. Nos. 5,460,905; 5,462,566; 5,582,623; and 5,587,253 describe the basic elements and performance requirements of lithium batteries and their components. A key issue in the development of high energy batteries is the choice of the electrolyte element to improve the possible output voltage, stability, cycle life, and safety of the battery. A large number of non-aqueous organic solvents have been suggested and investigated as electrolytes in connection with various types of cells containing lithium electrodes. U.S. Pat. Nos. 3,185,590; 3,578,500; 3,778,310; 3,877,983; 4,163,829; 4,118,550; 4,252,876; 4,499,161; 4,740,436; and 5,079,109 describe many possible electrolyte element combinations and electrolyte solvents, such as borates, substituted and unsubstituted ethers, cyclic ethers, polyethers, esters, sulfones, alkylene carbonates, organic sulfites, organic sulfates, organic nitrites and organic nitro compounds.

One class of organic electrolyte solvents that have received attention as a component of electrolyte elements for electrochemical cells and other devices are the sulfones. Sulfones can generally be divided into two types: the aromatic sulfones and the aliphatic sulfones. The aliphatic sulfones can also be divided into two types-the cyclic (commonly referred to as sulfolanes) and non-cyclic. The non-cyclic aliphatic sulfones form a potentially-attractive group of organic solvents that present a high chemical and thermal stability.

In particular, ethyl methyl sulfone (EMS) has shown remarkable electrochemical stability, reaching 5.8v vs. Li/Li$^+$ by a conservative stability criterion. For example, 2M LiPF$_6$/EMS has been used as the supporting electrolyte in a dual graphite cell which operates around 5.5v, and 1M LiPF$_6$/EMS has been used as the electrolyte in Li/T2-Li$_{2/3}$[Ni$_{1/3}$Mn$_{2/3}$]O$_2$ cell which operates up to 5.4v. Despite its success as solvent in those cases, EMS applications are limited by a shortcoming, i.e. its relatively high melting point, 36.5° C., which eliminates its use as a single solvent in electronic devices whose range of operation includes temperatures much below ambient. To overcome this limitation EMS must be blended with other high stability solvents that yield low-melting eutectics with EMS, or be replaced by alternative sulfones with lower melting points.

A eutectic mixture of EMS with dimethyl sulfone melts at 25° C., and the mixture has been used in lithium salt solution conductivity studies extending well below ambient, however, crystallization takes place on long exposure to low temperatures. Since single solvent electrolytes are desirable for a variety of reasons, and since alternative second components to provide lower-melting eutectics than the above are also desirable, a need exists to further study the synthesis of sulfone-containing molecular liquids.

SUMMARY

In one embodiment, the present specification discloses an electrolyte element for use in an electric current-producing device comprising one or more ionic electrolyte salts and a non-aqueous electrolyte solvent including one or more non-symmetrical, non-cyclic sulfones of the general formula: R1—SO2—R2. The R1 group is a linear or branched alkyl or partially or fully fluorinated linear or branched alkyl group having 1 to 7 carbon atoms. The R2 group, which is different in formulation than the R1 group, is a linear or branched or partially or fully fluorinated linear or branched oxygen containing alkyl group having 1 to 7 carbon atoms.

In another embodiment, the present specification discloses an electric current-producing device comprising a cathode and an anode. A non-aqueous electrolyte element is disposed between the cathode and anode. The non-aqueous electrolyte element includes an electrolyte salt and a non-symmetrical, non-cyclic sulfone of the general formula: R1—SO2—R2. R1 is an alkyl group, and R2 is an alkyl group including oxygen.

In another embodiment, the present specification discloses an electrolyte for a electric current-producing device comprising an non-aqueous electrolyte solvent including an non-symmetrical, non-cyclic sulfone of the general formula: R1—SO2—R2. R1 is an alkyl group, and R2 is an alkyl group including oxygen.

In another embodiment, the present specification discloses a method of forming an electric current-producing device, comprising the steps of providing a cathode, providing an anode, and providing a non-aqueous electrolyte element disposed between the cathode and anode. The non-aqueous electrolyte element includes an electrolyte salt and a non-symmetrical, non-cyclic sulfone of the general formula: R1—SO2—R2. R1 is an alkyl group, and R2 is an alkyl group including oxygen.

In yet another embodiment, the present specification discloses an electrolytic solvent comprising a sulfone compound and being configured to exhibit high chemical and thermal stability and high oxidation resistance. Such a sulfone may have be represented by a chemical formula of: $R1—SO_2—R2$ wherein $R^1$ is an alkyl group and $R^2$ is a partially oxygenated alkyl group. This electrolytic solvent may be combined with ionic salts, co-solvents, or other additives and may be used as an electrolyte element in an electric current producing device. This sulfone-based electrolyte can be used in an electric current producing device to generate high output voltages and maintain high oxidation resistance. Therefore, such a sulfone-based electrolyte can be implemented in electrolytic cells, rechargeable batteries, electric capacitors, fuel cells, and the like which comprise non-aqueous electrolyte elements to provide high energy storage capacity, long cycle life, and a low rate of self-discharge, with good thermal stability.

In yet another implementation, the present specification provides an electrolyte solvent of the formula: $R^1—SO_2—R^2$, wherein $R^1$ and $R^2$ are alkyl groups that are at least partially oxygenated. Such a solvent can be used in an electric current-producing devices and other devices.

In yet another implementation, the present specification provides an electrolyte solvent of the formula: $R^1—SO_2—R$ , wherein $R^1$ is an alkyl group, $R^2$ is an alkyl group that is at least partially oxygenated, and $R^1$, $R^2$, or both are partially or fully fluorinated. Such a solvent can be used in an electric current-producing devices and other devices.

In yet another implementation, the present specification provides an electrolyte comprising one or more ionic electrolyte salts and a solvent of the formula: $R^1—SO_2—R^2$, wherein $R^1$ is an alkyl group and $R^2$ is an alkyl group that is at least partially oxygenated. Such an electrolyte can be used in an electric current-producing devices and other devices Various features described in the present specification can be used to provide an electrolyte solution which combines high oxidation resistance and high ambient temperature conductivity, an electrolyte solution which exhibits exceptionally high conductivity and high chemical and electrochemical stability. An electrolyte solvent described in the present specification may also be combined with one or more ionic salts, one or more liquid co-solvents, gelling agents, ionically conductive solid polymers, and other additives.

These and other embodiments and implementations are described in detail in the drawing, the description and the claims.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Batteries are commonly used to power many types of electronics, motors, and other devices for use in portable applications. The battery may be rechargeable or disposable one-shot usage type. The battery provides operating power for integrated circuits in portable electronic systems, or an electromotive force to drive motors for industrial and automotive applications.

Figure 1:
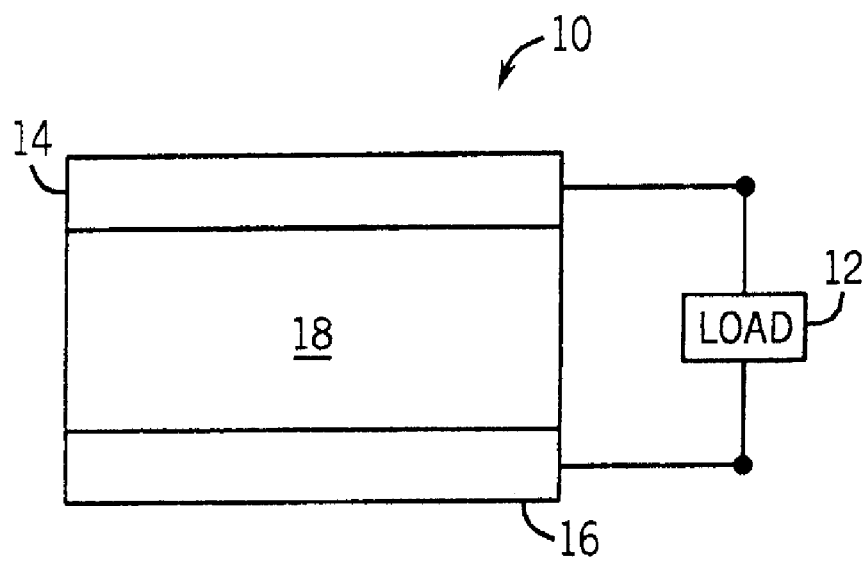
FIG. 1 illustrates a lithium battery providing power to a load.

FIG. 1 illustrates electric current-producing device 10 providing electrical power to load 12. In one embodiment, the electric current-producing device 10 is a battery or other voltaic cell. Alternatively, the electric current-producing device 10 is a supercapacitor. Device 10 may include a lithium-ion cell or lithium metal cell, or plurality of such cells. Device 10 has anode 14, cathode 16, and electrolyte 18. Anode 14 and cathode 16 are connected to load 12 to provide electrical power to the load. Electrolyte 18 contains a non-aqueous electrolyte element comprising a non-symmetrical, non-cyclic sulfone component, as described fully hereinafter, that is stable in the presence of the anode and cathode. Load 12 may be an electronic system, equipment in an industrial application, or motor for an automobile, just to name a few.

The material of anode 14 has one or more metals or metal alloys selected from the Group IA and IIA metals in the Periodic Table. For example, anode 14 may be made with lithium or sodium. The anode may also be alkali-metal intercalated carbon, such as LiCx where x is equal to or greater than 2. Also useful as anode materials are alkali-metal intercalated conductive polymers, such as lithium, sodium or potassium doped polyacetylenes, polyphenylenes, polyquinolines, and the like. Examples of other suitable anode material are lithium metal, lithium-aluminum alloys, lithium-tin alloys, lithium-intercalated carbons, lithium-intercalated graphites, calcium metal, aluminum, sodium, and sodium alloys.

Cathode 16 may be made with any of the commonly used cathode active materials. Examples of suitable cathode active materials are inorganic insertion oxides and sulfides, metal chalcogenides, elemental sulfur, organo-sulfur and carbon-sulfur polymers, conjugated polymers, and liquid cathodes. Useful inorganic insertion oxides include $CoO_2$, $NiO_2$, $MnO_2$, $Mn_2O_4$, $V_6O_{13}$, $V_2O_5$, and blends thereof. Useful inorganic sulfides include $TiS_2$, $MoS_2$, and the like. Suitable conjugated polymers include polyacetylene, poly(phenylene vinylene), and polyaniline. Useful liquid cathodes include $SO_2$, $SOCl_2$, $SO_2Cl_2$, and $POCl_3$. Useful organo-sulfur materials include those disclosed in U.S. Pat. Nos. 4,833,048; 4,917,974; 5,324,599; and 5,516,598.

Further examples of useful cathode active materials include organo-sulfur polymer materials, as described in U.S. Pat. No. 5,441,831, and carbon-sulfur materials, as described in U.S. Pat. Nos. 5,601,947 and 5,529,860. Sulfur containing cathode active organic materials as described in these disclosures comprise, in their oxidized state, a polysulfide moiety of the formula, -$S_m$-, wherein m is an integer equal to or greater than 3. Further useful composite cathode compositions including organo-sulfur or elemental sulfur. Cathode 16 may further comprise one or more materials which include: binders, electrolytes, and conductive additives, usually to improve or simplify their fabrication as well as improve their electrical and electrochemical characteristics.

Useful conductive additives are those known to one skilled in the art of electrode fabrication and are such that they provide electrical connectivity to the majority of the electroactive materials in the composite cathode. Examples of useful conductive fillers include conductive carbons (e.g., carbon black), graphites, metal flakes, metal powders, electrically conductive polymers, and the like.

In those cases where binder and conductive filler are desired, the amounts of binder and conductive filler can vary widely and the amounts present will depend on the desired performance. Typically, when binders and conductive fillers are used, the amount of binder will vary greatly, but will generally be less than about 15 wt % of the composite cathode. The amount of conductive filler used will also vary greatly and will typically be less than 20 wt % of the composite cathode. Useful amounts of conductive additives are generally less than 12 wt %.

The choice of binder material may vary widely so long as it is inert with respect to the composite cathode materials. Useful binders are those materials, usually polymeric, that allow for ease of processing of battery electrode composites. Examples of useful binders are organic polymers such as polytetrafluoroethylenes(TEFLONTM), polyvinylidine fluorides ($PVF_2$ or PVDF), ethylene-propylene-diene (EPDM) rubbers, polyethylene oxides (PEO), UV curable acrylates, UV curable methacrylates, and UV curable divinylethers, and the like.

For the case of the automotive application, battery-powered motors offer many interesting possibilities for fulfilling transportation needs with greater efficiency and reduced harm to the environment. Automobile batteries must be rechargeable and preferably deliver high voltages, e.g. greater than 4.5 VDC, to provide adequate power to the motor. The battery should also have good electrochemical stability and longevity. Electrolyte 18 plays an important role in the electrochemical performance of electric current-producing device 10, including the ability to generate high output voltages for maximum power transfer.

Electrolyte elements are useful in electrolytic cells, rechargeable batteries, electric capacitors, fuel cells, and function as a medium for storage and transport of ions. The term "electrolyte element," as used herein, relates to an element of an electric current-producing device which comprises an electrolyte solvent, one or more electrolyte salts, and optionally other additives including polymer electrolytes and gel-polymer electrolytes. Any liquid, solid, or solid-like material capable of storing and transporting ions may be used, so long as the material is chemically inert with respect to anode 14 and cathode 16, and the material facilitates the transportation of ions between the anode and the cathode. In the special case of solid electrolytes, these materials may additionally function as separator materials between the anode and cathode.

The electrolyte elements of the present invention include one or more ionic electrolyte salts and a non-aqueous electrolyte solvent. The non-aqueous electrolyte solvent contains one or more non-symmetrical, non-cyclic sulfones, and optionally other additives, such as one or more electrolyte co-solvents, gelling agents, ionically conductive solid polymers, and/or other additives. The electrolyte elements may be prepared by dissolving one or more ionic electrolyte salts in one or more non-aqueous electrolyte solvents.

As a feature of the present invention, a new sulfone is introduced into the composition of electrolyte 18. The sulfones are provided in the battery electrolyte to increase the possible output voltage and available power from the battery. In particular, sulfones with different length of oligo ethylene glycol segments have been synthesized and tested for use in rechargeable lithium batteries. Relative to the model compound EMS, which has a melting point of 36.5° C., the new sulfones have low melting points, mostly depressed below room temperature. Their conductivities are lower than that of EMS. The highest ambient temperature conductivity of $10^{-2.58}$ S.cm$^{-1}$ is obtained for 0.7M LiTFSI/MEMS solution. The sulfones show wide electrochemical stability windows, in excess of 5.0v vs Li/Li$^+$, increasing with decreasing length of the oligoether chains. A cell with lithium metal anode and manganate cathode performed well, maintaining high coulomb efficiency over 200 cycles.

Figure 2:
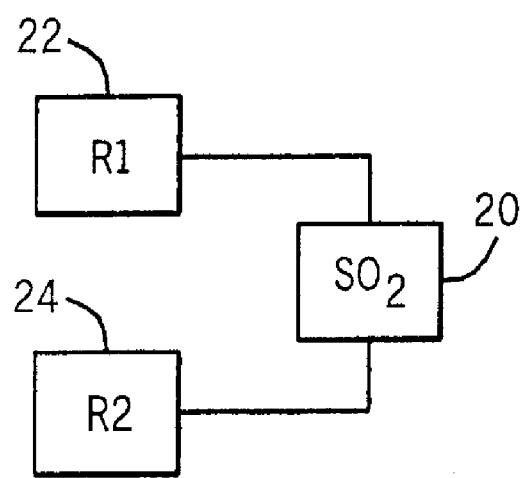
FIG. 2 illustrates non-symmetrical, non-cyclic sulfone group coupled with a R1 alkyl group and R2 oxygen containing alkyl group.

The non-aqueous electrolyte solvents include a non-symmetrical, non-cyclic sulfone, suitable for use in electric current-producing devices, such as device 10. As shown in FIG. 2, the non-symmetrical, non-cyclic sulfone has the general formula: R1—SO2—R2. The SO2 group 20 represents the sulfone group. The R1 group 22 is a linear or branched alkyl or partially or fully fluorinated linear or branched alkyl group having 1 to 7 carbon atoms. The R2 group 24 is a linear or branched or partially or fully fluorinated linear or branched alkyl group containing oxygen and having 1 to 7 carbon atoms. In another embodiment, the R1 and R2 groups each have 1 to 4 carbon atoms.

The SO2 sulfone group is the same group that occurs in the following compounds: ethylmethyl sulfone (EMSF, CH3CH2—SO2—CH3), ethyl-iso-propyl sulfone (EiPSF, CH3CH2—SO2—CH(CH3)2), ethyl-sec-butyl sulfone (EsBSF, CH3CH2—SO2—CH(CH3)(CH2CH3)), ethyl-iso-butyl sulfone (EiBSF).

Examples of the R1 alkyl group are: methyl ($-CH_3$); ethyl ($-CH_2CH_3$); n-propyl ($-CH_2CH_2CH_3$); n-butyl ($-CH_2CH_2CH_2CH_3$); n-pentyl ($-CH_2CH_2CH_2CH_2CH_3$); n-hexyl ($-CH_2CH_2CH_2CH_2CH_2CH_3$); n-heptyl ($-CH_2CH_2CH_2CH_2CH_2CH_2CH_3$); iso-propyl ($-CH(CH_3)_2$); iso-butyl ($-CH_2CH(CH_3)_2$); sec-butyl ($-CH(CH_3)CH_2CH_3$); tert-butyl ($-C(CH_3)_3$); iso-pentyl ($-CH_2CH_2CH(CH_3)_2$); trifluoromethyl ($-CF_3$); 2,2,2-trifluoroethyl ($-CH_2CF_3$); 1,1-difluoroethyl ($-CF_2CH_3$); perfluoroethyl ($-CF_2CF_3$); 3,3,3-trifluoro-n-propyl ($-CH_2CH_2CF_3$); 2,2-difluoro-n-propyl ($-CH_2CF_2CH_3$); 1,1-difluoro-n-propyl ($-CF_2CH_2CH_3$); 1,1,3,3,3-pentafluoro-n-propyl ($-CF_2CH_2CF_3$); 2,2,3,3,3-pentafluoro-n-propyl ($-CH_2CF_2CF_3$); perfluoro-n-propyl ($-CF_2CF_2CF_3$); perfluoro-n-butyl ($-CF_2CF_2CF_2CF_3$); perfluoro-n-pentyl ($-CF_2CF_2CF_2CF_2CF_3$); perfluoro-n-hexyl ($-CF_2CF_2CF_2CF_2CF_2CF_3$); perfluoro-n-heptyl ($-CF_2CF_2CF_2CF_2CF_2CF_2CF_3$); $-CF(CH_3)2$; $-CH(CH_3)CF_3$; $-CF(CF_3)_2$; $-CH(CF_3)2$; $-CH_2CF(CH_3)2$; $-CF_2CH(CH_3)2$; $-CH_2CH(CH_3)CF_3$; $-CH_2CH(CF_3)_2$; $-CF_2CF(CF_3)_2$; $-C(CF_3)_3$.

Examples of the R2 oxygen containing alkyl group are: $-CH_2OCH_3$; $-CF_2OCH_3$; $-CF_2OCF_3$; $-CH_2CH_2OCH_3$; $-CH_2CF_2OCH_3$; $-CF_2CH_2OCH_3$; $-CF_2CF_2OCH_3$; $-CF_2CF_2OCF_3$; $-CF_2CH_2OCF_3$; $-CH_2CF_2OCF_3$; $-CH_2CH_2OCF_3$; $-CHFCF_2OCF_2H$; $-CF_2CF_2OCF(CF_3)_2$; $-CF_2CH_2OCF(CF_3)_2$; $-CH_2CF_2OCF(CF_3)_2$; $-CH_2CH_2OCF(CF_3)_2$; $-CF_2CF_2OC(CF_3)_3$; $-CF_2CH_2OC(CF_3)_3$; $-CH_2CF_2OC(CF_3)_3$; $-CH_2CH_2OC(CF_3)_3$; $-CH_2CH_2OCH_2CH_3$; $-CH_2CH_2OCH_2CF_3$; $-CH_2CF_2OCF_2CH_3$; $-CH_2CH_2OCF_2CF_3$; $-CH_2CF_2OCH_2CH_3$; $-CH_2CF_2OCF_2CH_3$; $-CH_2CF_2OCH_2CF_3$; $-CH_2CF_2OCF_2CF_3$; $-CF_2CH_2OCH_2CH_3$; $-CF_2CH_2OCF_2CH_3$; $-CF_2CH_2OCH_2CF_3$; $-CF_2CH_2OCF_2CF_3$; $-CF_2CF_2OCH_2CH_3$; $-CF_2CF_2OCF_2CH_3$; $-CF_2CF_2OCH_2CF_3$; $-CF_2CF_2OCF_2CF_3$; $-CF_2CF_2CF_2OCH_3$; $-CF_2CH_2CF_2OCH_3$; $-CH_2CF_2CF_2OCH_3$; $-CH_2CF_2CH_2OCH_3$; $-CH_2CH_2CF_2OCH_3$; $-CH_2CH_2CH_2OCH_3$; $-CF_2CF_2CH_2OCF_3$; $-CF_2CH_2CF_2OCF_3$; $-CH_2CF_2CF_2OCF_3$; $-CH_2CH_2CF_2OCF_3$; $-CH_2CH_2CH_2CH_2OCH_3$; $-CH_2CH_2CH_2CH_2OCH_3$; $-CH_2CH_2CH_2CH_2CH_2CH_2OCH_3$; $-CH_2CH_2OCH_2CH_2OCH_3$; $-CH_2CH_2OCH_2CH_2OCH_2CH_2OCH_3$.

In an alternate embodiment, the R1 alkyl group may also contain oxygen, e.g. using any one of the formulations described for the R2 group. However, the R1 and R2 groups will each have a different formulation from the other, e.g. in terms of chemical structure or length of segments.

One group of electrolyte salts includes $MClO_4$, $MPF_6$, $MPF_x(C_nF_{2n+1})_{6-x}$, $MBF_4$, $MBF_{4-x}(C_nF_{2n+1})_x$, $MAsF_6$, MSCN, $MB(CO_2)_4$ ("LiBOB"), and $MSO_3CF_3$, where "M" represents lithium or sodium. Also available are electrolyte solutions including $MN(SO_2CF_3)_2$ as the electrolyte salt, which exhibits exceptionally high conductivity combined with high chemical and electrochemical stability.

The electrolyte elements may further include one or more liquid electrolye co-solvents (i.e., in addition to a non-symmetrical, non-cyclic sulfone), gelling agents, ionically conductive solid polymers, and other additives. Suitable electrolyte co-solvents, gelling agents or ionically conductive solid polymers include any of those commonly used with lithium metal and lithium-ion cells. For example, suitable liquid electrolyte co-solvents for use in the electrolyte elements include any one of the commonly used electrolyte solvents. Examples of useful liquid electrolyte co-solvents include carbonates, N-methyl acetamide, acetonitrile, symmetric sulfones, sulfolanes, 1,3-dioxolanes, glymes, polyethylene glycols, siloxanes, and ethylene oxide grafted siloxanes, and blends thereof. Examples of useful carbonates include ethylene carbonate (EC) and propylene carbonate (PC). Examples of useful glymes includes tetraethyleneglycol dimethyl ether (TEGDME) and 1,2-dimethoxyethane.

Liquid electrolyte elements are often used in combination with one of the common porous separators. Liquid electrolyte solvents or plasticizing agents are often themselves useful as gel forming agents for gel-polymer electrolytes. Examples of gelling agents which are useful in the electrolyte elements are those prepared from polymer matrices derived from polyethylene oxides (PEO), polypropylene oxides, polyacrylonitriles, polysiloxanes, polyimides, polyethers, sulfonated polyimides, perfluorinated membranes (NafionTM resins), polyeFthylene glycols, polyethylene glycol-bis-(methyl acrylates), polyethylene glycol-bis(methyl methacrylates), derivatives of the foregoing, copolymers of the foregoing, crosslinked and network structures of the foregoing, blends of the foregoing, and the like.

Examples of ionically conductive solid polymers suitable for use in the electrolyte elements are those having polyethers, polyethylene oxides (PEO), polyimides, polyphosphazenes, polyacrylonitriles (PAN), polysiloxanes, polyether grafted polysiloxanes, derivatives of the foregoing, copolymers of the foregoing, crosslinked and network structures of the foregoing, and blends of the foregoing, to which is added an appropriate ionic electrolyte salt. Ionically conductive solid polymers electrolytes may additionally function as separator materials between the anode and cathode.

Other additives which are useful in the electrolyte elements include soluble additives, such as: vinylene carbonate (VC), ethylene sulfite (ES), propylene sulfite (PS), fluoroethylen sulfite (FEC), α-bromo-γ-butyrolactone, methyl chloroformate, t-butylene carbonate, 12-crown-4, carbon dioxide ($CO_2$), sulfur dioxide ($SO_2$), sulfur trioxide and other inorganic additives; acid anhydrides to reduce or eliminate the presence of water; reaction products of carbon disulfide and lithium, possibly a soluble sulfide, as disclosed in U.S. Pat. No. 3,532,543; high concentrations of water as described in U.S. Pat. Nos. 5,432,425 and 5,436,549; and polysulfide additives.

The non-aqueous electrolyte solvents are particularly useful in electrolytic cells, rechargeable batteries, electric capacitors, fuel cells, and the like, which comprise non-aqueous electrolyte elements and which require high energy storage capacity, long shelf life, and a low rate of self-discharge. The electrolyte solvents are particularly useful in electrolytic cells comprising alkali-metal-containing electrodes, and particularly to lithium intercalation electrodes.

The high oxidation resistance of the ambient temperature electrolyte solutions of the present invention result from the stability of the $-SO_2-$ group when in a non-cyclic, non-symmetric sulfone structure, characterized by freezing temperatures low enough to enable utilization in ambient temperature applications. When such a sulfone is utilized as a solvent to dissolve inorganic electrolyte salts of highly oxidation resistant anions such as $ClO_4$, $CF_3SO_3$ (triflate), and in particular, bis(trifluoromethane sulfonyl) imide($-N(CF_3SO_2)_2$, lithium imide), then solutions which combine exceptional oxidation resistance with high ambient temperature conductivity are obtained as, for example, shown in FIG.

Figure 3:
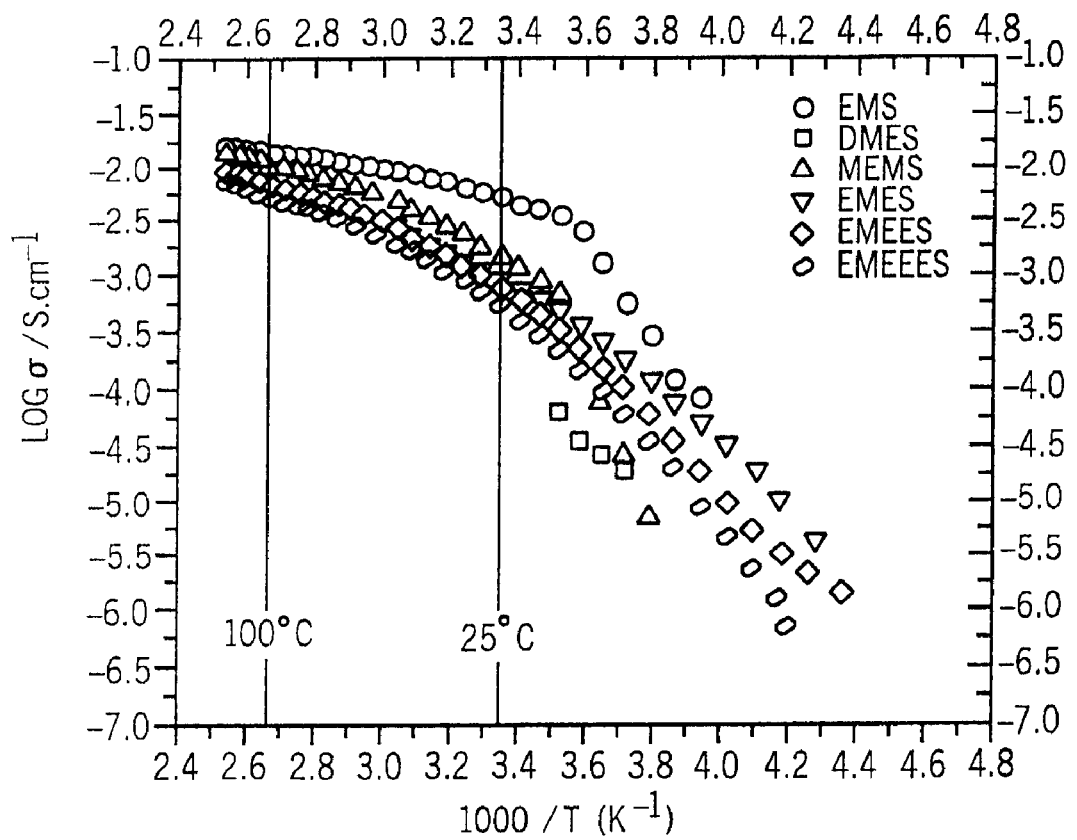
FIG. 3 is a graph of conductivities of 1M LiTFSI in different sulfones.

3. In general, FIG. 3 illustrates the DC electrical conductivities of electrolytes of various solutions of alkali metal salts in sulfones. As seen in the figure, at 25° C. the conductivity of EMS is more than half order of magnitude higher than those of the oligoether sulfones of the present work, indicating the great advantage of EMS as a single solvent in the sulfone family.

The process of making, using, and testing electric current-producing device 10, including anode 14, cathode 16, and electrolyte 18 containing the non-aqueous electrolyte solvents having non-symmetrical, non-cyclic sulfone groups defined above by R1-SO2-R2 is now described in detail.

Oligoether-containing sulfides were synthesized by reacting halide compounds of oligoethylene glycols with sodium methanethiolate or with sodium ethanethiolate. Sulfones with structures listed in Table 1 were obtained by oxidation of the synthesized sulfides with $H_2O_2$. Table 1 is summary of physical properties of synthesized sulfones, wherein note[1] is estimated melting point, note[2] is boiling point under atmosphere pressure estimated by nomograph, and note[3] is estimated boiling point.

TABLE 1

| Sulfones | m.p (° C.) | b.p (° C.) | $T_g$(° C.) |
|---|---|---|---|
| $CH_3CH_2SO_2CH_3$ (EMS) | 36.5 | 85~87/4.0 mm (~240)[2] | — |
| $CH_3OCH_2CH_2SO_2CH_3$ (MEMS) | 15.0 | 96~98/1.0 mm (~275)[2] | −89.5 |
| $CH_3OCH_2CH_2SO_2C_2H_5$ (EMES) | 2.0 | 103~105/1.0 mm (~286)[2] | −91.0 |
| $CH_3(OCH_2CH_2)_2SO_2C_2H_5$ (EMEES) | <0[1] | >290[3] | −87.6 |
| $CH_3(OCH_2CH_2)_3SO_2C_2H_5$ (EMEEES) | <0[1] | >290[3] | −82.5 |
| $CH_3OCH_2CH_2SO_2CH_2CH_2OCH_3$ (DMES) | 47.0 | >290[3] | −90.7 |

Glass transition temperature $T_g$ was measured using a DTA instrument. The heating rate was 10K/min. $T_g$ was defined as the onset temperature of the heat capacity jump and $T_m$ was defined as the temperature at which the melting peak reaches its maximum. The boiling point was recorded during the distillation process.

Electrolyte solutions of different salt concentrations were prepared by dissolving calculated amount of lithium salts in the respective sulfones. The measurement of DC conductivity was carried out using an automated frequency impedance analyzer. The measurements were made automatically during heating of the precooled samples at 1K/min by means of a programmed controller. To determine electrochemical characteristics, cyclic voltammetry was performed using a potentiostat/galvanostat with a three-electrode cell. The working electrode was a platinum wire, and the counter and reference electrodes were lithium foil in the voltage range of −0.3-6.0V. Most scans were made at room temperature at a typical scan rate of 1 mv/s.

Electrochemical half cells, Li‖ sulfone electrolyte‖ MCMB25-28 (MCMB for mesocarbon microbeads), and Li‖ sulfone electrolyte‖ $LiCr_{0.015}Mn_{1.985}O_4$ were constructed using fiberglass paper as the separator. The cathode solution having 82% active material, 10% carbon black and 8% PVdF in N-methylpyrrolindone was cast directly on the pre-weighed stainless steel electrode. The electrode was dried, first at room temperature and then at 100° C. under vacuum for two days. The weight of the electrode was determined inside the dry box, and the weight of active material obtained by difference. The anode composite electrodes were made in a similar way from a slurry of 90% MCMB25-28 and 10% PVdF in N-methylpyrrolindone. The cell construction and the tests were all carried out in an argon-filled glove box. The voltage profile of the charge/discharge process was monitored using a battery cycler. A constant current ranging from 0.01~0.1 $mA/cm^2$ was used with pre-set cut-off voltage of 0.01~2.0V for Li ‖ electrolyte ‖ MCMB25-28 cell and 3.0~4.3V for Li ‖ electrolyte ‖ $LiCr_{0.015}Mn_{1.985}O_4$ cell. At these cut-off voltages a computerized cycler automatically switched the test cells to charge or discharge.

All of the ether fragment additions caused the lowering of melting point relative to EMS except for one case (dimethoxyethyl sulfone) in which symmetry was retained. Indeed, in some cases crystallization was not observed at all. For instance, introduction of the smallest fragment, the methoxy group, at the ethyl end of EMS yielding methoxyethylmethyl sulfone (MEMS), lowers the melting point to 15° C. The subambient melting of the compound formed by adding the same group to the symmetric dimethyulsulfone (DMS) (mp=110° C.) yielding methoxymethylmethyl-sulphone (MMMS), the change in melting point being 90K. Attaching the methoxy group to one end of the symmetric diethyl sulfone (DES) gives ethyl methoxy ethyl sulfone (EMES) with an even lower melting point, 2° C., vs 74° C. for the symmetric compound. These data, along with data for several other variants, are summarized in Table 1.

The glass transition temperatures of the new sulfones are described as follows. For the mono asymmetric sulfones such as EMES, EMEES (ethyl methoxyethoxyethyl sulfone) and EMEEES (ethyl methoxyethoxyethoxyethyl sulfone), the glass transition temperature increases with increasing ether chain length, see Table 1, implying that the increasing molecular weight effect offsets the decrease in $T_g$ expected from the dilution of the cohesive sulfone groups.

The ionic conductivities, at any temperature, follow the order: EMS>MEMS>EMES>DMES>EMEES>EMEEES, and appear to follow the order of the respective sulfone viscosities. Of the possible synthesized sulfones, the room temperature conductivities of lithium salt solutions of MEMS and EMES are the highest. Since the difference is not large, and the ease of synthesis and purification greater in the case of EMES, the latter is adopted for making solutions for the electrochemical stability and cell performance tests.

Figure 4A:
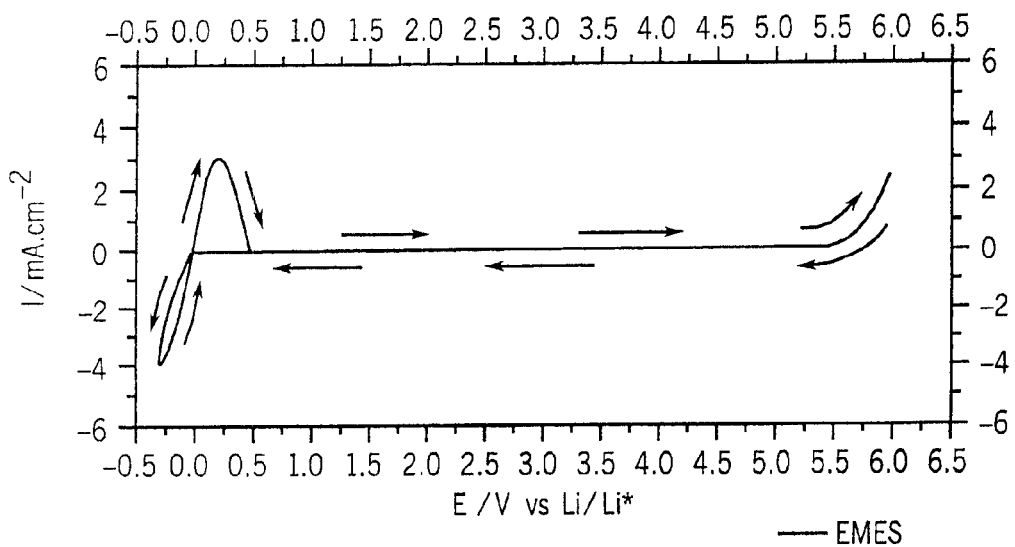
FIGS. 4a-4b are graphs of electrochemical stability ranges ("windows") for 1M LiTFSI in different sulfone solutions.
Figure 4B:
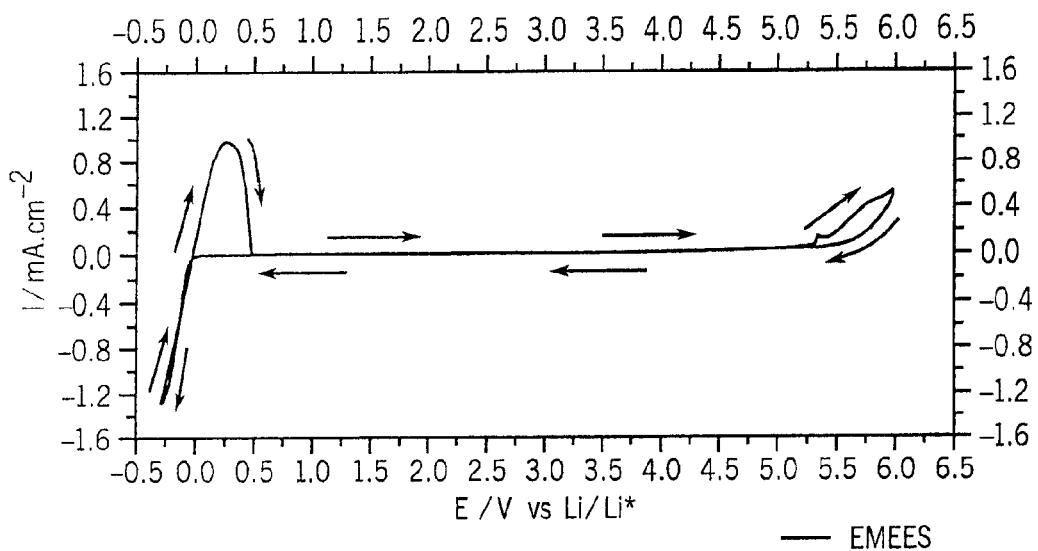

In FIGS. 4a-4b, the cyclic voltammetry scans from which the electrochemical windows for 1.0M LiTFSI solutions at Pt working electrode under the scan rate of 1 mv/s in EMES, EMEES are obtained. FIG. 4a shows EMES, while FIG. 4b is EMEES. The cyclic voltammetry scans are well above 5.0v vs. $Li^+/Li$. FIGS. 4a-4b also show that, with increasing ether chain length, the electrochemical stability decreases, from 5.6v for EMES, 5.3v for EMEES, (vs 5.9v for EMS) showing that stability advantage of sulfone, as a class of solvent, is diminishing with increasing ether group concentration.

Figure 5:
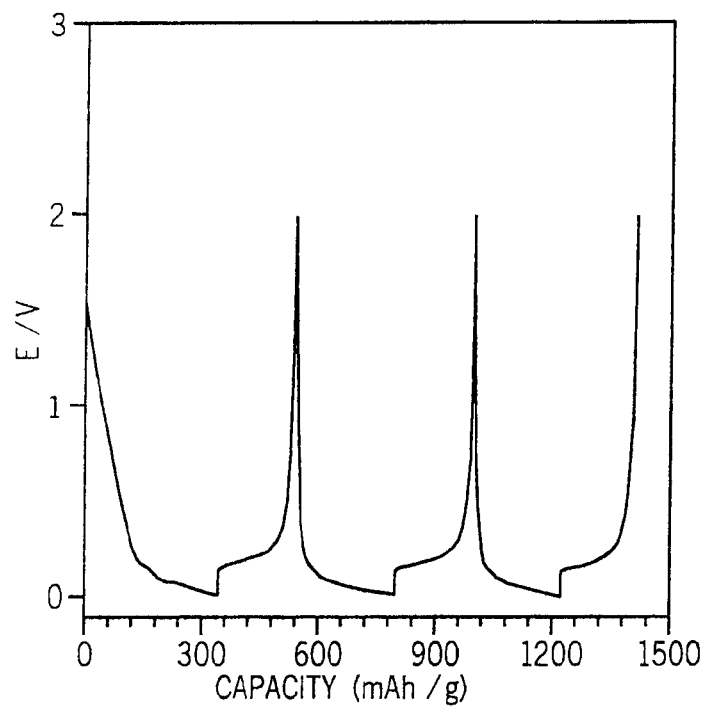
FIG. 5 is a graph of performance of the cell MCMB25-28|1M LiPF$_6$/EMES|Li under the current density of 0.013 mA cm$^{-2}$.

FIG. 5 shows a test of the ether sulfone-based solutions for reversible intercalation into the graphite designated MCMB25-28, for the first three cycles of the cell MCMB25-28‖1M $LiPF_6$/EMES‖Li during cycling at constant current density of 0.013 $mA.cm^{-2}$. The corresponding charge and discharge capacities of the first three cycles are 343.0, (202.8); 251.4, (200.5); 219.2, (193.0) mAh/g, respectively.

Figure 6A:
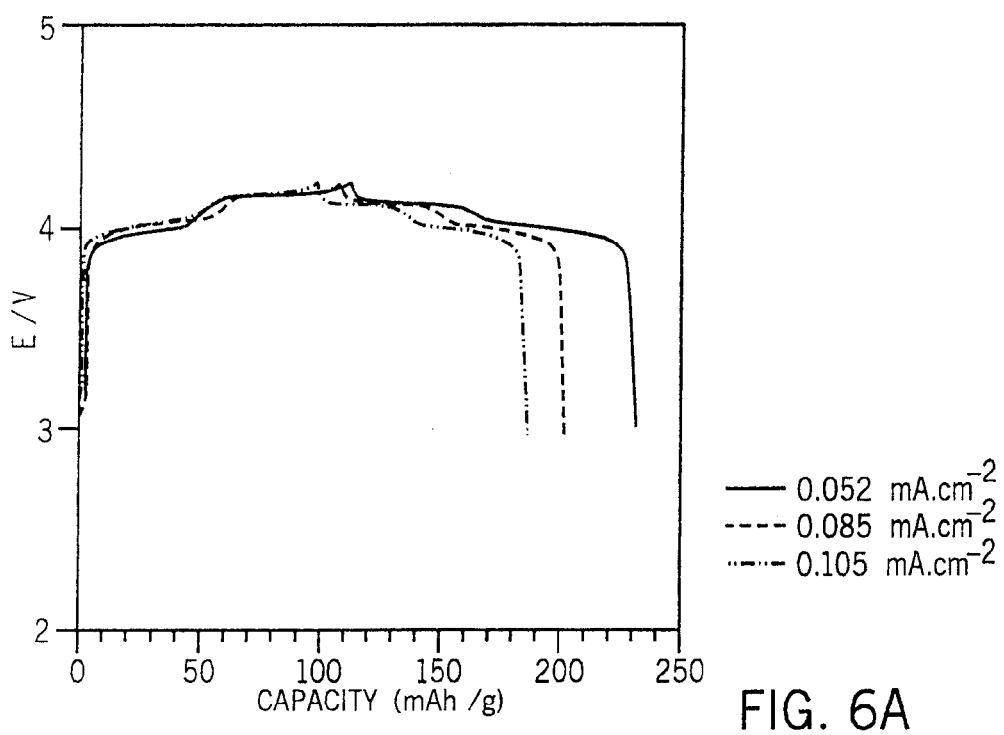
FIGS. 6a-6b are graphs of cell performance under different current densities.
Figure 6B:
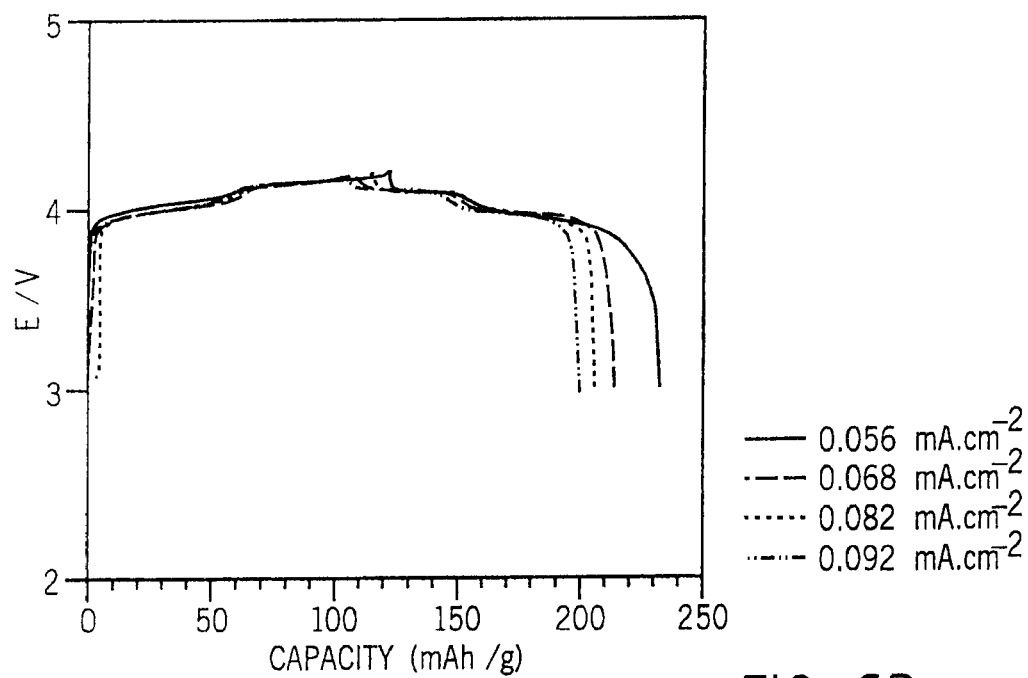

Next, the performance of the new solutions with lithium metal anodes and $Cr^{3+}$-modified $LiMn_2O_4$ spinel intercalation cathodes are tested. FIGS. 6a-6b compare the cell performance using different 1M lithium salts in EMES during the first cycle under different current densities. FIG. 6a shows data from the cell using 1M LiTFSI/EMES electrolyte. FIG. 6b shows data from the cell using 1M LiPF$_6$/EMES electrolyte. Each cell shows two well-defined discharge plateaus, around 4.0 and 4.1v versus Li/Li,$^+$ respectively. It is also seen that the capacities decrease with increasing current density.

Figure 7:
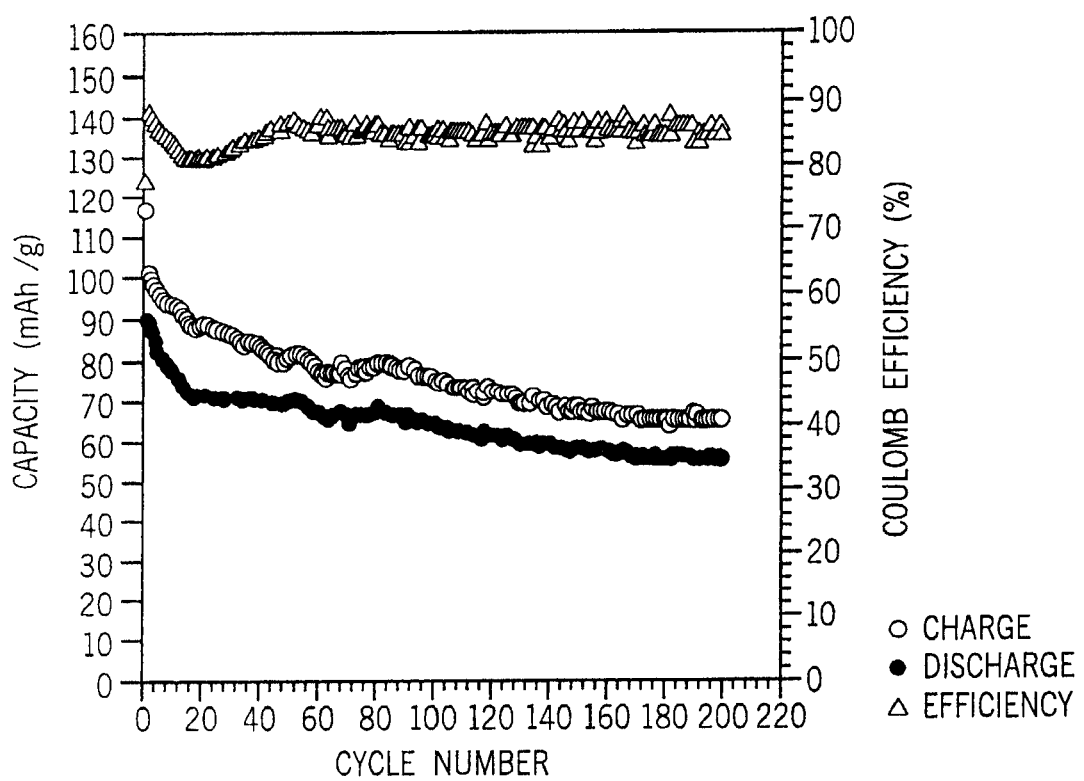
FIG. 7 is a graph of charge/discharge capacity and coulomb efficiency of the cell LiCr$_{0.015}$Mn$_{1.985}$O$_4$|1M LiPF$_6$/EMES|Li under the current density of 0.092 mA cm$^{-2}$.

When the charge/discharge rates are raised, there is progressively less time for lithium ions to diffuse through the LiMn$_2$O$_4$ crystallites. At higher rates, only lithium ions located in the outer regions of the grains are accessible for reaction, causing a reduction in capacity. However, comparatively the cell using 1M LiPF$_6$ electrolyte exhibited a higher capacity than the cell using 1M LiTFSI/EMES electrolyte under similar current densities. In addition it has been shown that the charge/discharge capacities for the cells using LiTFSI/EMES decreases very quickly with cycling due to its failure to form effective SEI layers, thus LiPF$_6$ is useful as the lithium salt for full cell test. The corresponding cell performance under the current density of 0.092 mA cm$^{-2}$ using 1M LiPF$_6$/EMES in terms of charge/discharge capacities and coulomb efficiency is shown in FIG. 7. This cell showed excellent cyclability, more than 200 cycles, tending to stabilize after 200 cycles at a discharge capacity around 50 mAh/g and a stable coulomb efficiency around 0.86.

It is further noted that improved performance may be obtained when the present hybrid sulfones are mixed with fluorinated sulfones on the one hand or with alkyl carbonates on the other. The incorporation of oligoether segments into molecular sulfones lowers the freezing point to sub-ambient values, without decreasing the electrochemical window, but may increase the viscosity with consequent lowering of lithium salt solution conductivities. However, any decrease in conductivity can be compensated by fluorination of the R1 and R2 alkyl groups. The oligoether-containing sulfones retain high electrochemical stability with "windows" well above 5.0v versus Li$^+$/Li. It is possible that Li$^+$ may be intercalated/de-intercalated into graphite electrode by using oligoether-containing sulfones.

In another embodiment, the novel non-cyclic, non-symmetrical sulfones are substituted with perfluoromethyl (trifluoromethyl, —CF3) or perfluoromethylene (—CF2) groups. Substitution of a methyl, —CH3, group by a perfluoromethyl, —CF3, is surprisingly found to advantageously decrease the viscosity of the sulfone, thereby increasing the conductivity of the electrolyte solutions and increasing the penetration of the electrolytes into the cathode and separator in electrolytic cells at ambient conditions.

Useful are the novel fluorinated sulfones CF3CH2SO2CH3 (2,2,2-trifluoroethylmethyl sulfone, CF3MMSF) and CF3CH2CH2SO2CH3 (CF3EMSF). Also available is CF3MMSF which exhibits very high conductivity, for example, in lithium chlorate solutions. The fluorinated non-symmetrical, non-cyclic sulfone further offers superior wetting, penetration and other surfactant properties.

Several embodiments of the present invention are described in the following examples, which are offered by way of illustration and not by way of limitation.

In Example 1, involving preparation of methoxyethyl methyl sulfone (MEMS), 45.6 g thiourea was dissolved in 150 ml water, 28.8 ml dimethyl sulfate was added and the solution was refluxed for 1 hour. After cooling to room temperature, 48 g NaOH in 75 ml distilled water was added and the solution was stirred for 1 hour, then 55 g chloroethyl methyl ether (ClCH$_2$CH$_2$OCH$_3$) was added dropwise. After addition the solution was slowly heated to reflux for 10 hours. The upper organic layer was separated to obtain the methoxyethyl methyl sulfide (CH$_3$OCH$_2$CH$_2$SCH$_3$) with a yield of 55%. The sulfide was set to oxidation with 30wt % H$_2$O$_2$ in acetic acid. On completion of oxidation, most of the solvent was removed. Dilute NaOH aqueous solution was added to neutralize excess acetic acid. Water was removed by rotary evaporation and the residual paste was extracted with chloroform at least three times. The chloroform was combined and dried over anhydrous sodium sulfate. Finally chloroform was removed and the crude product was distilled under vacuum at 95-100° C. to obtain the pure product MEMS.

In Example 2, involving preparation of MEMS, pre-weighed empty bottle was cooled in dry ice acetone solution and Methane thiol was slowly charged into the bottle. The net weight of methanethiol was obtained by the difference before and after weighing as 21.5 g. 71.6 g 25 wt % NaOH aqueous solution was charged into stainless steel pressure vessel and cooled with ice water. The vessel was vacuumed and then under stirring methanethiol was slowly charged into the vessel. The solution was stirred for 1 hr before 38 g chloroethyl methyl ether (ClCH$_2$CH$_2$OCH$_3$) was added. The solution was stirred for overnight at room temperature and then heated to reflux for 10 hrs before the process was stopped. The solution was cooled and the upper organic layer was separated to give a yield of 87%. The sulfide was then subjected to oxidation with 120 g 30 wt % H$_2$O$_2$ and 100 ml acetic acid. After work up as in Example 1 the crude product was distilled under vacuum and 35 g pure product was isolated with a yield 71%.

In Example 3, involving characterization of MEMS, glass transition temperature T$_g$ was measured using a DTA instrument. The heating rate used was 10K/min. T$_g$ was defined as the onset temperature of the heat capacity jump and T$_m$ was defined as the temperature at which the melting peak reaches its maximum. The boiling point was recorded during the distillation process. The T$_g$ and T$_m$ of MEMS are −89.5° C. and 15° C. respectively, as shown in Table 1. The boiling point of MEMS is estimated as 275° C. at atmosphere pressure.

Electrolyte solutions of different salts were prepared by dissolving calculated amount of lithium salts in MEMS at about 80° C., in the case of LiPF$_6$ salt the temperature is controlled around 50° C. The measurement of DC conductivity was carried out using a frequency impedance analyzer. The measurements were made automatically during heating of the pre-cooled samples at 1K/min by means of a programmed controller. The temperature dependence curve for MEMS containing 1.0M LiTFSI is shown in FIG. 3. The T$_g$ and room temperature ionic conductivities of 1.0M different lithium salts in MEMS are shown in Table 2. In general, Table 2 shows glass transition temperature (T$_g$/° C.) and room temperature conductivity log($\sigma_{25}$/S cm$^{-1}$) of 1M different lithium salt solution in different sulfones.

TABLE 2

| Sulfone | LiTFSI | | LiSO$_3$CF$_3$ | | LiClO$_4$ | | LiBF$_4$ | | LiPF$_6$ | | LiSCN | |
|---|---|---|---|---|---|---|---|---|---|---|---|---|
| | T$_g$ | log$\sigma_{25}$ | T$_g$ | log$\sigma_{25}$ | T$_g$ | log$\sigma_{25}$ | T$_g$ | log$\sigma_{25}$ | T$_g$ | log$\sigma_{25}$ | T$_g$ | log$\sigma_{25}$ |
| EMS | −96.0 | −2.27 | −103.0 | −3.00 | −110.0 | −2.95 | −111.0 | −2.80 | −86.2 | −2.55 | −101.5 | −3.35 |
| MEMS | −81.0 | −2.83 | −83.4 | −3.00 | −88.0 | −2.93 | −84.0 | −3.03 | −82.0 | −2.91 | −86.5 | −3.15 |
| EMES | −83.3 | −2.85 | −87.5 | −3.05 | −88.0 | −3.10 | −85.5 | −2.89 | −88.7 | −2.92 | −82.5 | −3.62 |

TABLE 2-continued

| Sulfone | LiTFSI | | LiSO$_3$CF$_3$ | | LiClO$_4$ | | LiBF$_4$ | | LiPF$_6$ | | LiSCN | |
|---|---|---|---|---|---|---|---|---|---|---|---|---|
| | T$_g$ | log$\sigma_{25}$ | T$_g$ | log$\sigma_{25}$ | T$_g$ | log$\sigma_{25}$ | T$_g$ | log$\sigma_{25}$ | T$_g$ | log$\sigma_{25}$ | T$_g$ | log$\sigma_{25}$ |
| EMEES | −73.4 | −3.12 | −74.0 | −3.71 | −76.0 | −3.39 | −76.4 | −3.48 | −70.4 | −3.61 | −77.0 | −3.92 |
| EMEEES | −71.6 | −3.25 | −68.6 | −3.85 | −79.4 | −3.50 | −78.5 | −3.55 | −77.0 | −3.80 | −74.6 | −3.96 |
| DMES | −84.0 | −2.99 | −83.0 | −3.70 | −76.4 | −3.16 | −84.0 | −3.30 | −82.0 | −3.09 | −82.5 | −3.72 |

In Example 4, involving preparation of ethyl methoxyethyl sulfone (EMES), 57 g NaOH was dissolved in 57 g H$_2$O and cooled with ice water, 88.4 g ethanethiol was added to the solution slowly. The solution was stirred for half hour before 135 g chloroethyl methyl ether (ClCH$_2$CH$_2$OCH$_3$) was added. After addition the solution was stirred at room temperature for several hours before it was heated to reflux for overnight. The reaction was stopped and cooled to room temperature. Ethyl methoxyethyl sulfide (CH$_3$CH$_2$SCH$_2$CH$_2$OCH$_3$) in the upper organic layer was separated, 156 g, yield 91%. 100 g Ethyl methoxyethyl sulfide was set up for oxidation with 170 g 50 wt % H$_2$O$_2$ and 200 ml acetic acid. After work up as in Example 1 the crude sulfone was distilled and the fraction at 85-88° C. /0.3 Torr is collected.

In Example 5, involving characterization of EMES, the T$_g$ and T$_m$ of EMES are −91.0° C. and 2° C. respectively, as shown in Table 1. The boiling point of MEMS is estimated as 286° C. at atmosphere pressure. Salt solutions of EMES were prepared, as described in Example 3, and their ionic conductivities were measured using the method described in Example 3. The temperature dependence curve for EMES containing 1.0M LiTFSI is shown in FIG. 3. The T$_g$ and room temperature ionic conductivities of 1.0M of different lithium salts in EMES are shown in Table 2.

The cyclic voltammogram of 1M LiTFSI/EMES electrolyte is recorded at 1.0mv/s at a Pt working electrode with lithium as both counter and reference electrode using a potentiostat/galvanostat instrument, as shown in FIG. 4a.

In Example 6, involving an electric current-producing device employing EMES electrolytes, electrochemical half cells, Li ∥ sulfone electrolyte ∥ MCMB25-28, and Li ∥ sulfone electrolyte ∥ LiCr$_{0.015}$Mn$_{1.985}$O$_4$ are constructed using fiber glass paper as the separator. The cathode solution having 82% active material, 10% carbon black and 8% PVdF in N-methylpyrrolindone is cast directly on the pre-weighed stainless steel electrode. The electrode is dried, first at room temperature and then at 100° C. under vacuum for two days. The weight of the electrode is determined inside the dry box, and the weight of active material obtained by difference. The MCMB25-28 composite electrodes are made in a similar way from slurry of 90% MCMB25-28 and 10% PVdF in N-methylpyrrolindone.

Test cells were constructed by using Whatman glass fiber filter soaked in the electrolyte solution of Example 5 as the separator and a lithium anode and LiCr$_{0.015}$Mn$_{1.985}$O$_4$ (or MCMB25-28) cathode. The tests were all carried out in an argon-filled glove box. The voltage profile of the charge/discharge process was monitored using a battery cycler. A constant current ranging from 0.01~0.1 mA/cm$^2$ were used with pre-set cut-off voltage of 0.01~2.0V for Li∥ electrolyte∥ MCMB25-28 cell and 3.0~4.3V for Li∥ electrolyte∥ LiCr$_{0.015}$Mn$_{1.985}$O$_4$ cell respectively. At these cut-off voltages a computerized cycler automatically switches the test cells to charge or discharge. The test results are shown in FIGS. 5, 6a-b, and 7, respectively.

Figure 8A:
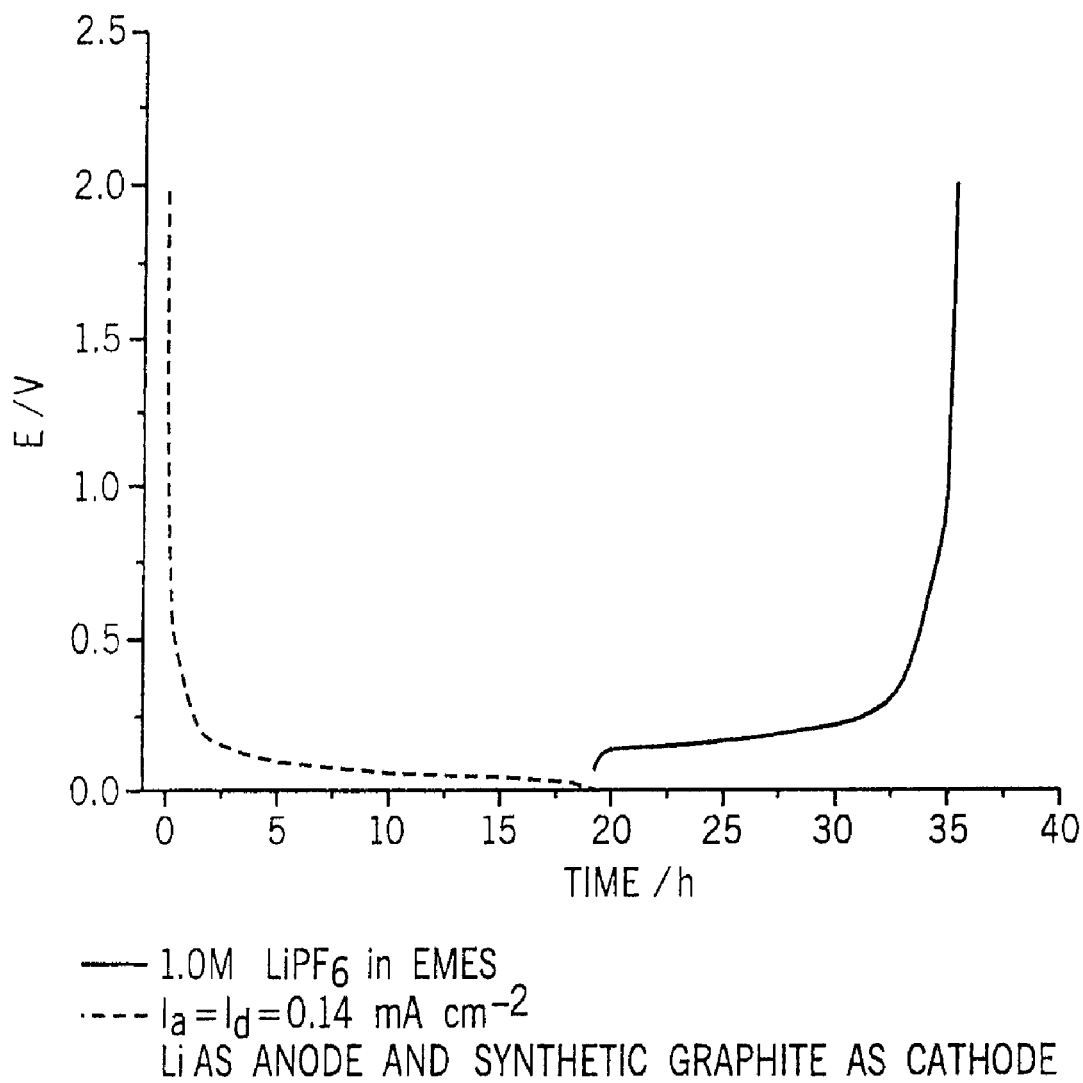
FIGS. 8a-8b are graphs of charge and discharge profile of half cell of Li||Graphite and full cell of Graphite||LiCoO$_2$ using 1.0M LiPF$_6$/EMES as the electrolyte, respectively.
Figure 8B:
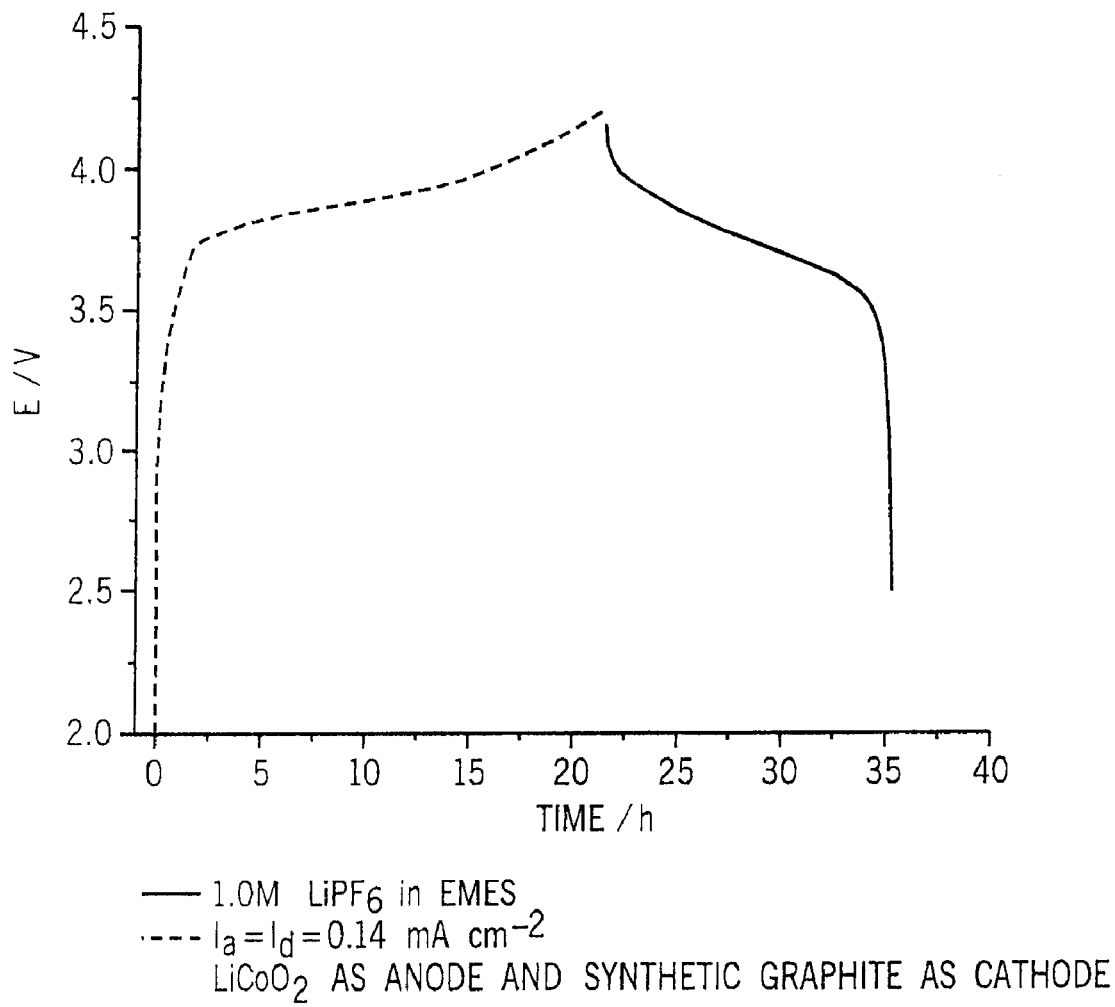

Another set of experiments are performed using commercial electrode sheets (synthetic graphite and LiCoO$_2$). The electrodes are cut into disc with area of 0.72 cm$^2$ and assembled either in a half cell of Li ∥ electrolyte ∥ graphite or full cell of graphite ∥ electrolyte ∥ LiCo$_{O2}$. A constant current density of 0.14 mA/cm$^2$ was used for both charging and discharging with pre-set cut-off voltage of 0.01~2.0V for Li ∥ electrolyte ∥ graphite cell and 2.5~4.2V for graphite ∥ electrolyte ∥ LiCoO$_2$ cell, respectively. The result is shown in FIGS. 8a-8b.

Figure 9A:
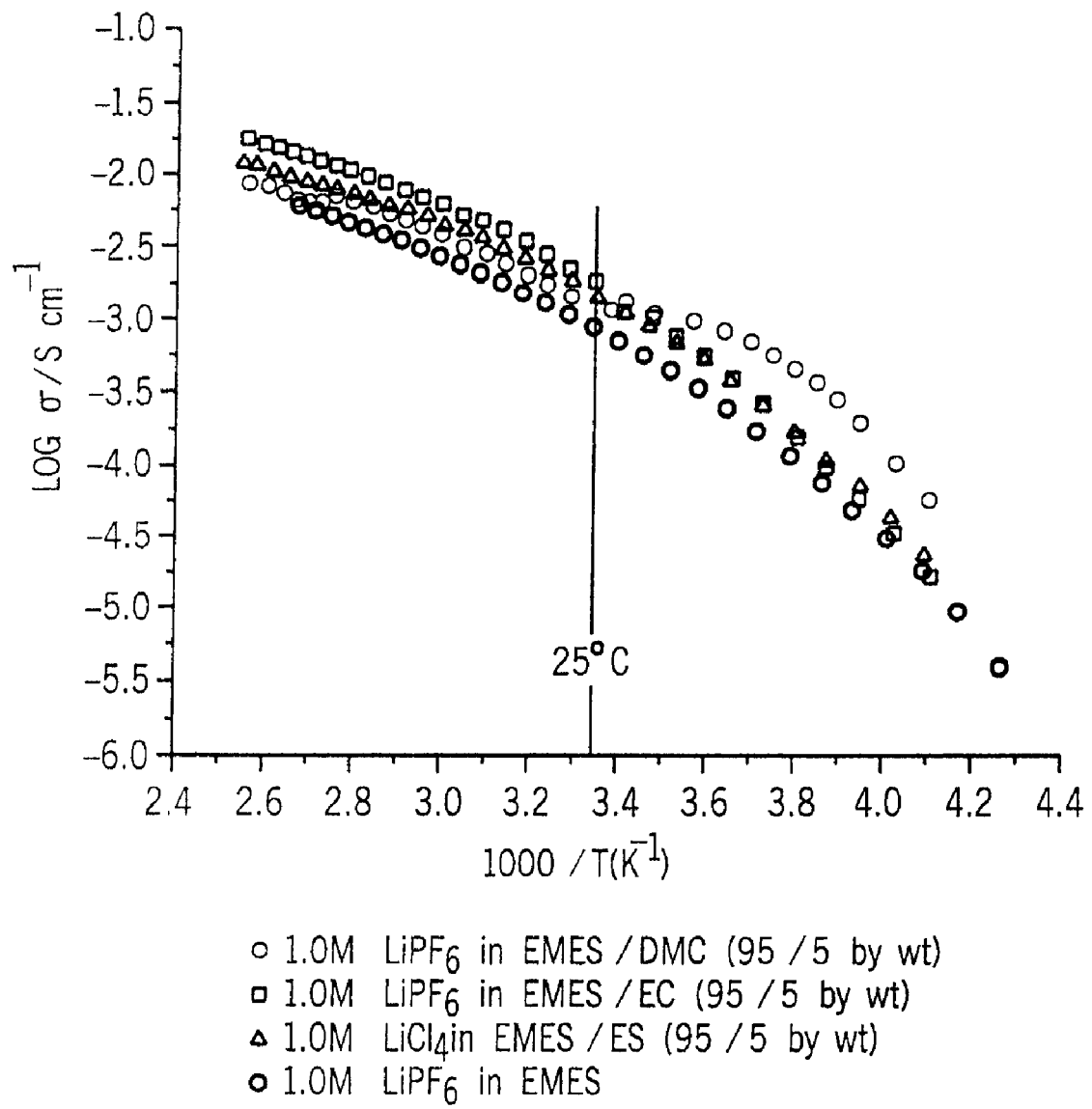
FIGS. 9a-9b are graphs of temperature dependence of ionic conductivities of 1.0M lithium salts, A) 1.0M lithium salts in EMES containing 5 wt % carbonates (EC and DMC) and ethylene sulfite(ES); B) 1.0MLiPF$_6$ in EMES containing different percentage of EC.
Figure 9B:
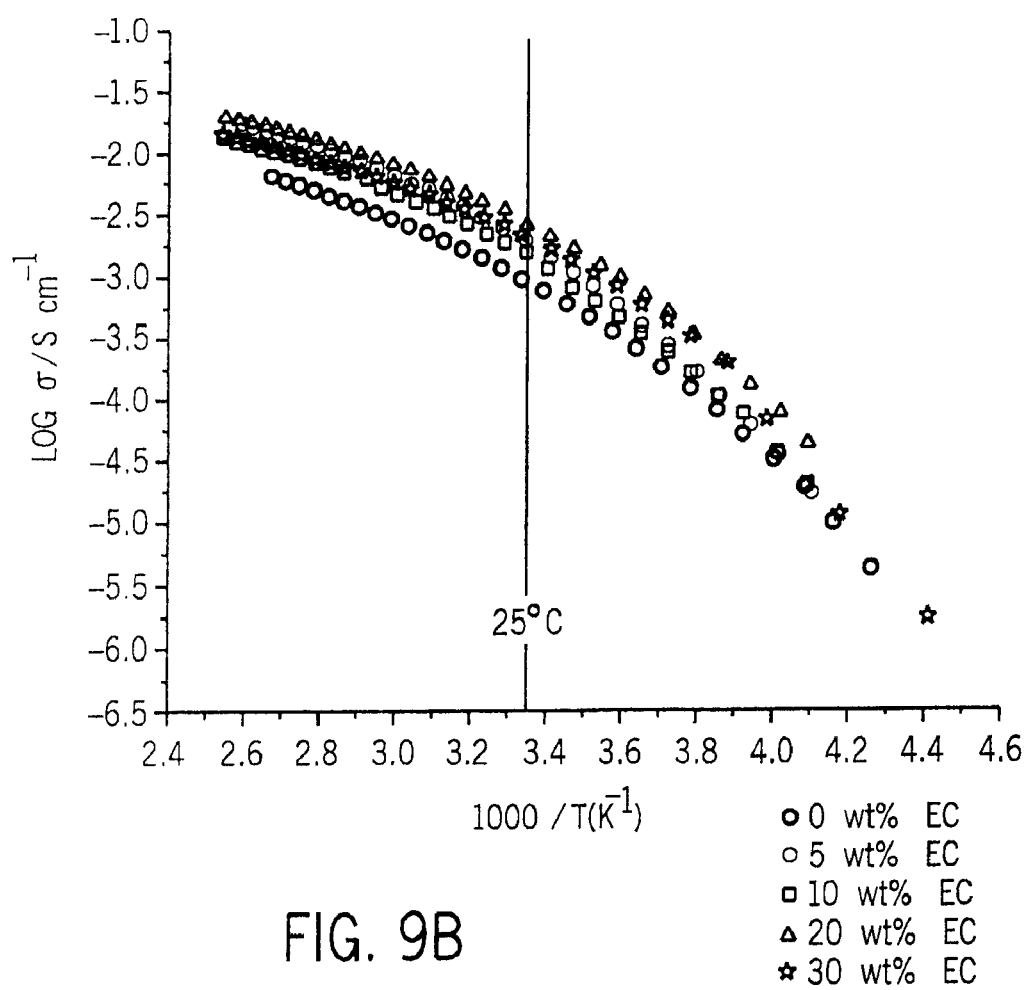
Figure 10A:
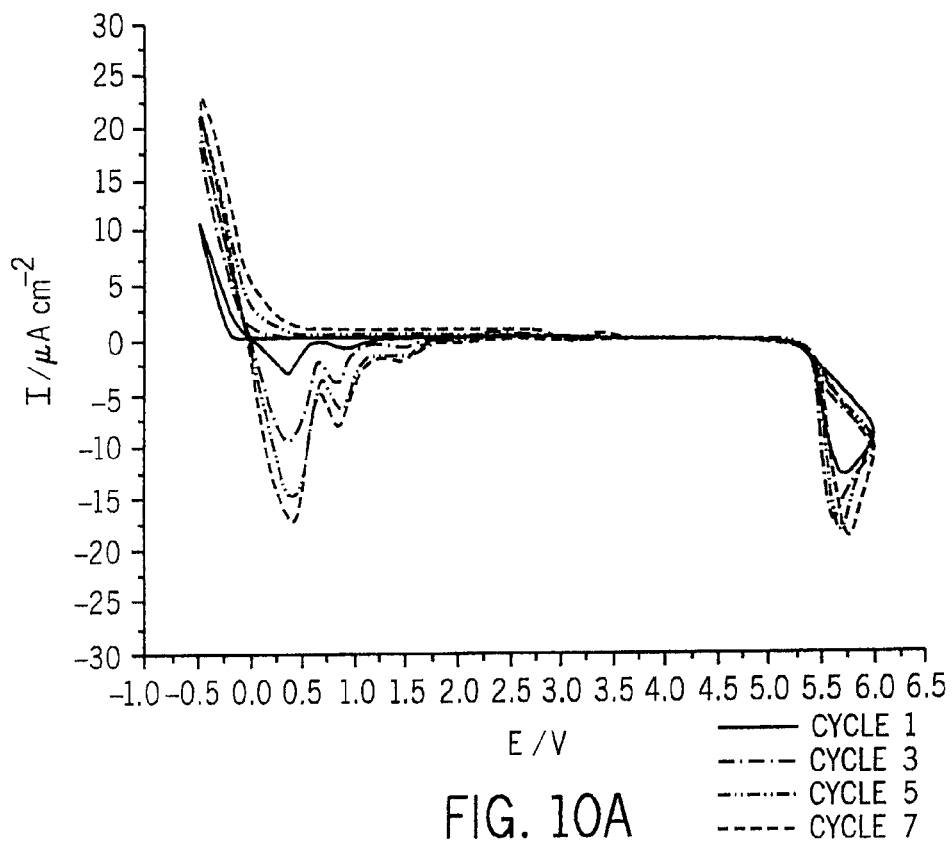
FIGS. 10a-10d are graphs of cyclic voltammograms for 1M LiPF$_6$ in different EMES/EC mixtures, A) 5 wt % EC; B) 10 wt % EC; C) 20 wt % EC; D) 30 wt % EC.
Figure 10B:
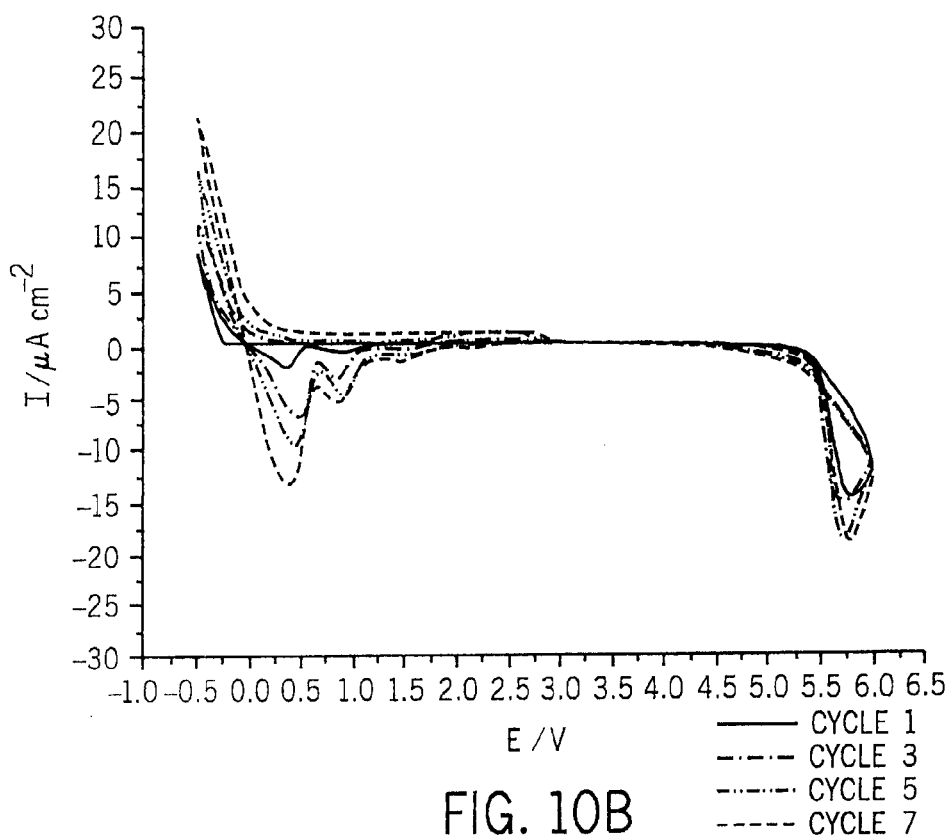
Figure 10C:
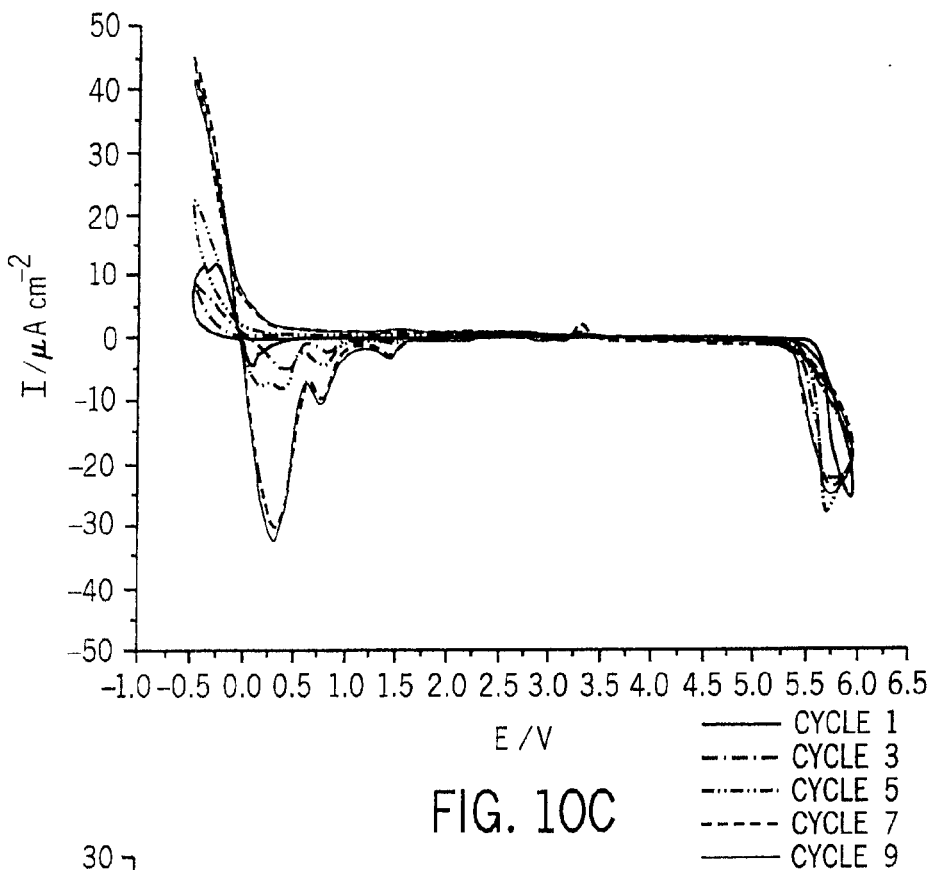
Figure 10D:
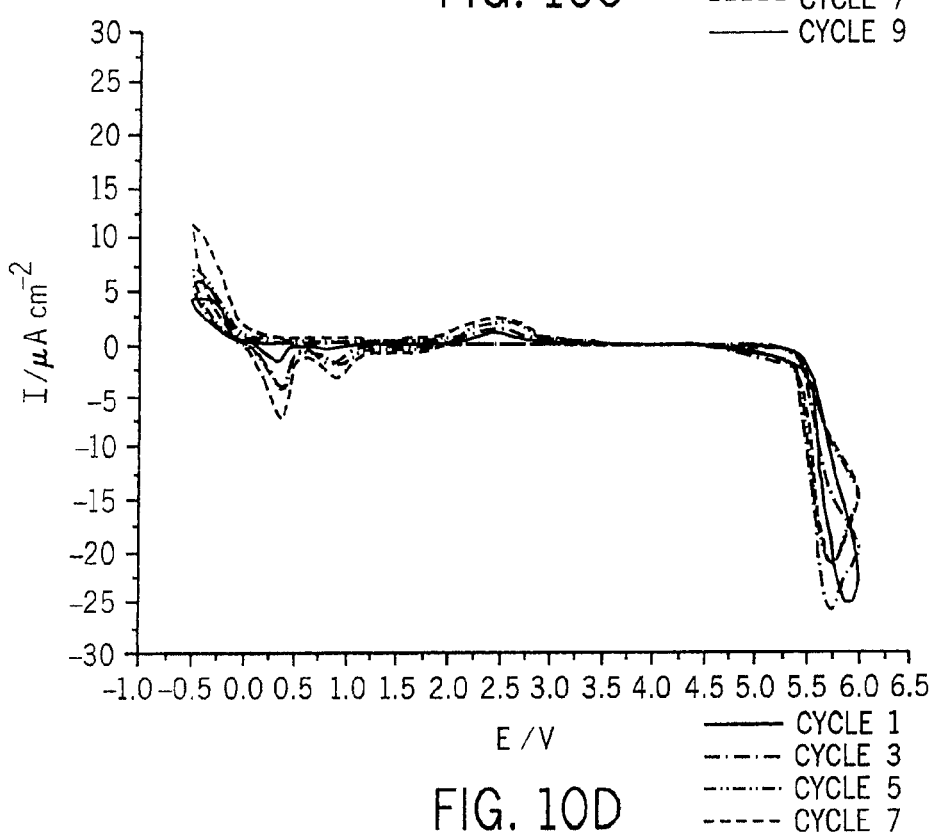
Figure 11A:
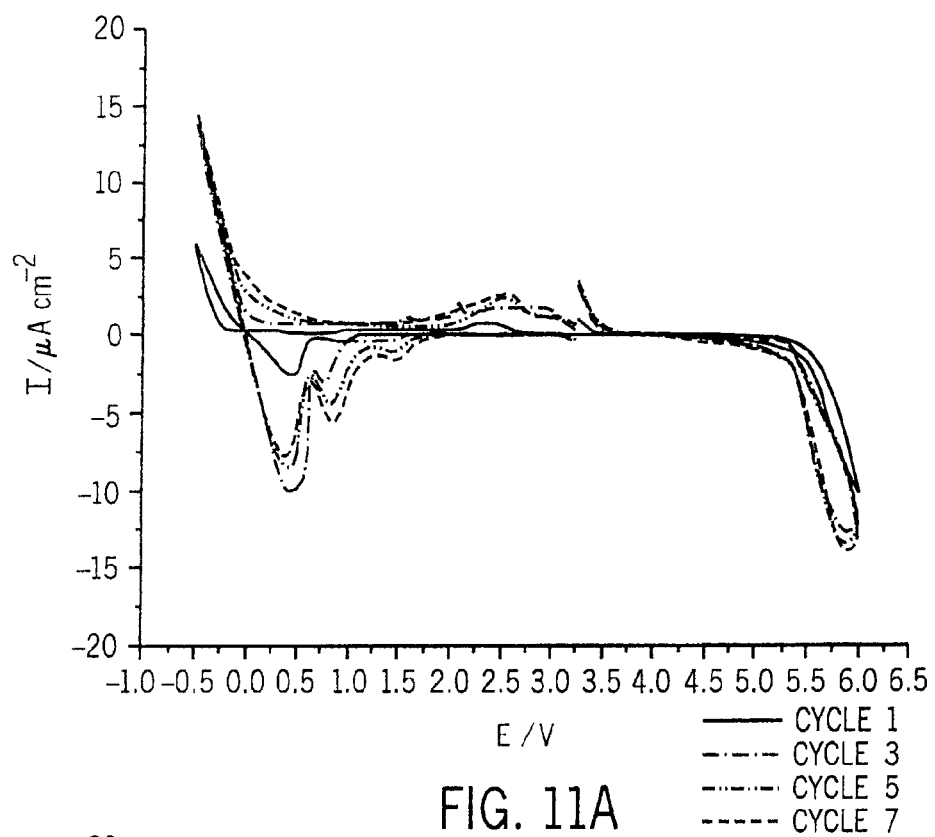
FIGS. 11a-11d are graphs of cyclic voltammograms for 1M LiPF$_6$ in different EMES/DMC mixtures, A) 5 wt % DMC; B) 10 wt % DMC; C) 20 wt % DMC; D) 30 wt % DMC.
Figure 11B:
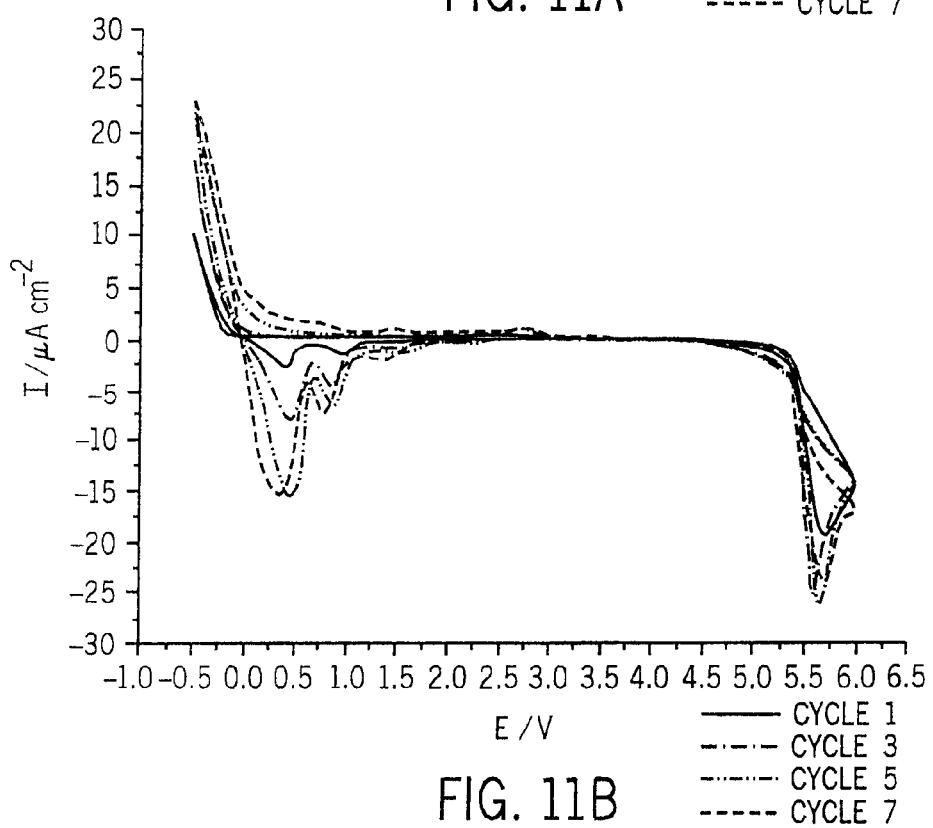
Figure 11C:
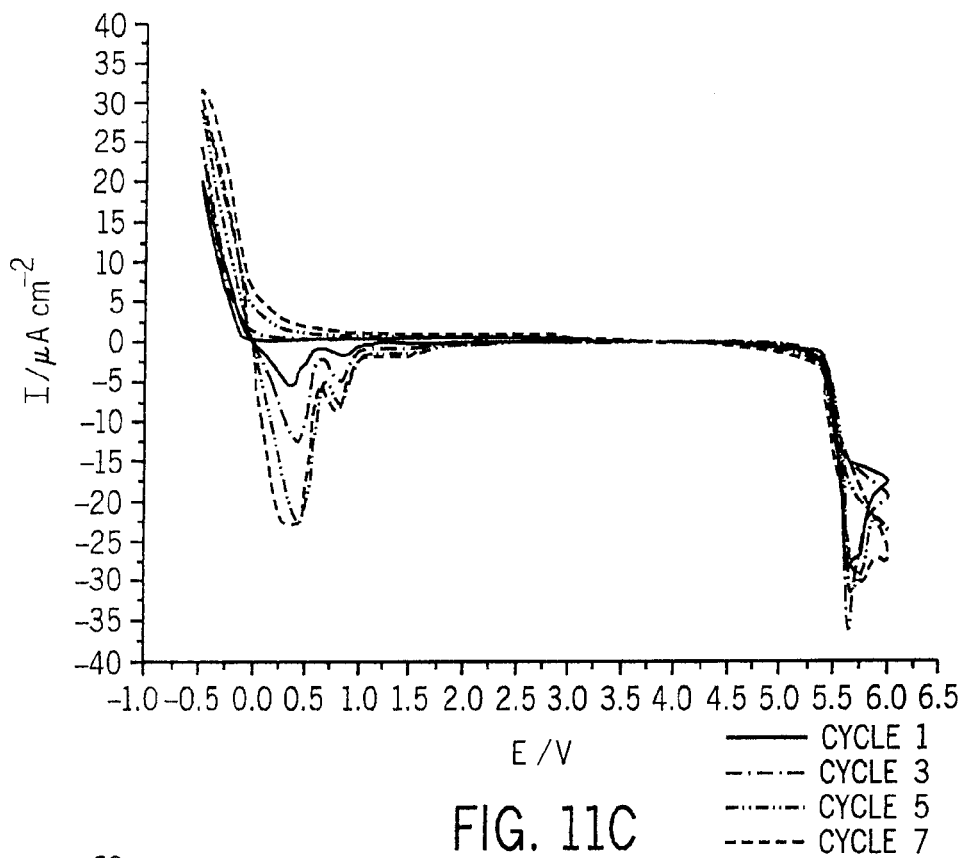
Figure 11D:
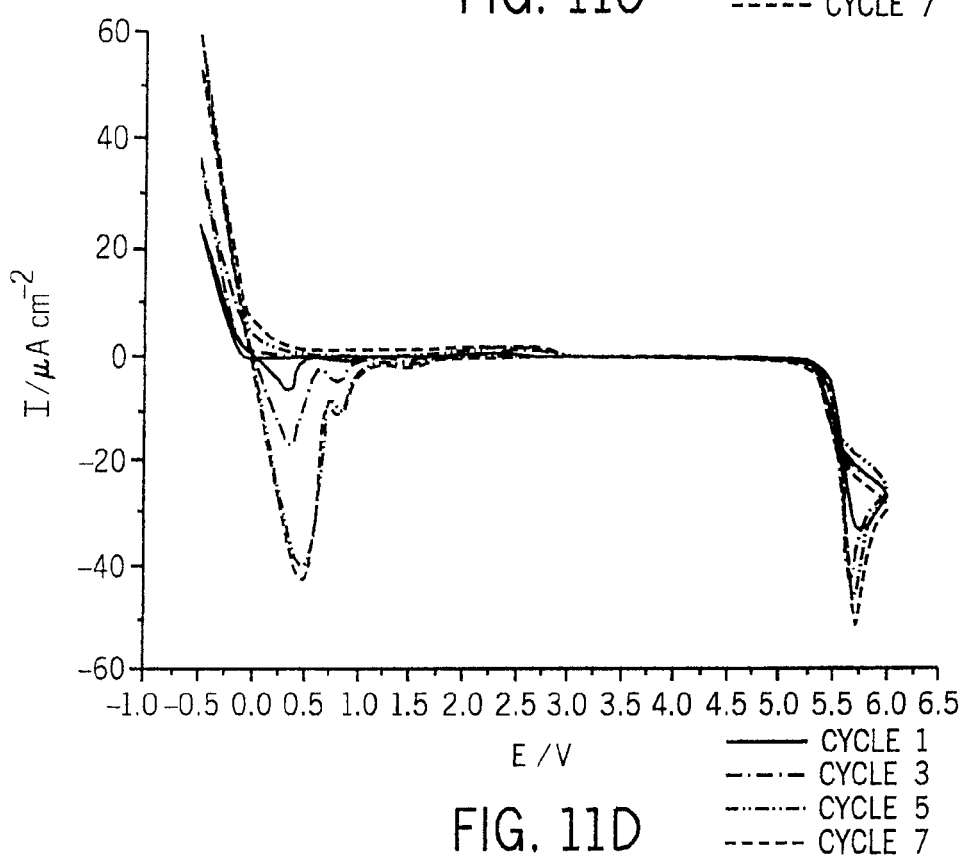

In Example 7, involving characterization of mixtures of EMES with carbonates, the mixtures of EMES with carbonates were prepared by mixing different weight percentage of either ethylene carbonate (EC) or dimethyl carbonate (DMC) in EMES. 1.0M LiPF$_6$ electrolyte solution was prepared by dissolving the salt in the mixtures at about 50° C., as described in Example 3. The ionic conductivities were measured using the method described in Example 3 and their temperature dependence curves are shown in FIGS. 9a-9b. Addition of EC to the electrolyte solution increases the ionic conductivities in all cases due to the higher dielectric constant of EC.

The cyclic voltammograms of 1M LiPF$_6$ in EMES/EC and EMES/DMC are measured, as described in Example 5, which is shown in FIGS. 10a-10d and 11a-11d, respectively. FIGS. 10a-10d are graphs of cyclic voltammograms for 1M LiPF6 in different EMES/EC mixtures. A) 5 wt % EC; B) 10 wt % EC; C) 20 wt % EC; D) 30 wt % EC. FIGS. 11a-11d are graphs of cyclic voltammograms for 1M LiPF6 in different EMES/DMC mixtures.A) 5 wt % DMC; B) 10 wt % DMC; C) 20 wt % DMC; D) 30 wt % DMC. Note that the electrochemical stability windows are all higher than 5.2v.

Figure 12:
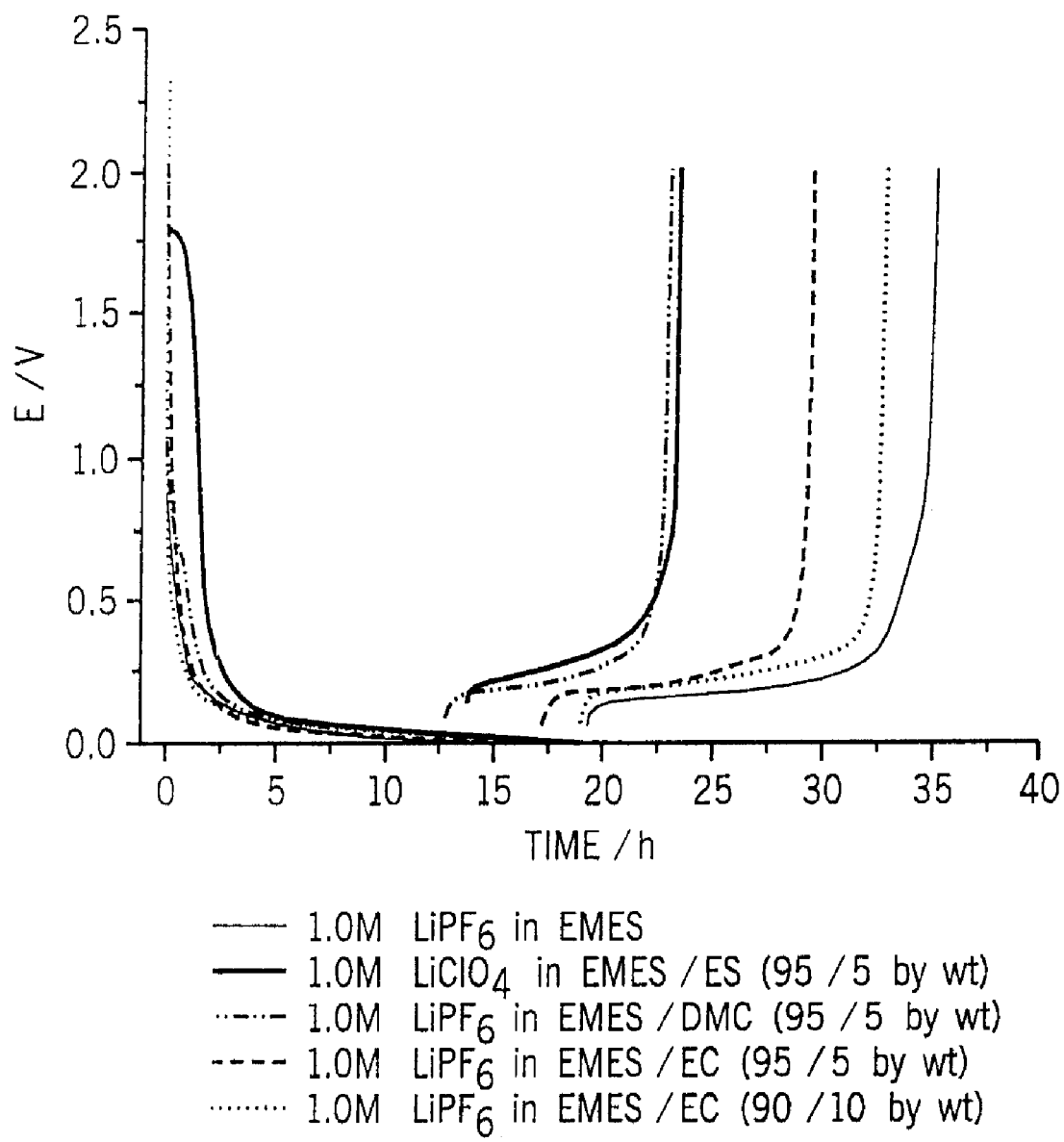
FIG. 12 is a graph of a first lithium intercalation and de-intercalation profile on graphite electrode using different 1.0M LiPF$_6$ electrolyte solutions.
Figure 13:
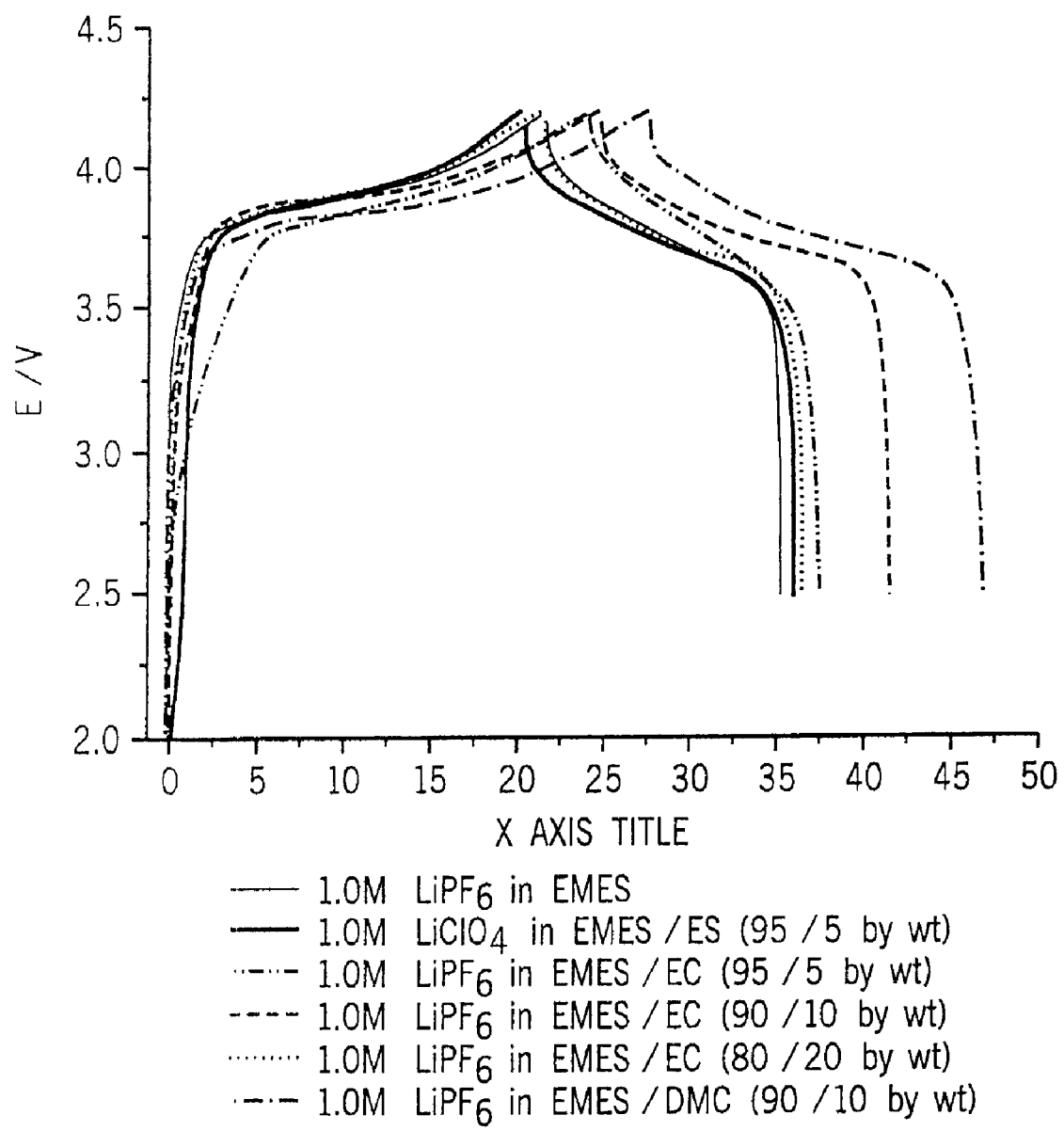
FIG. 13 is a graph of a first charge and discharge profile of full cell of graphite ||LiCoO$_2$ using different 1.0M LiPF$_6$ electrolyte solutions.

Half cell of Li ∥ electrolyte ∥ graphite or full cell of graphite ∥ electrolyte ∥ LiCoO$_2$ were built using the 1M LiPF$_6$ electrolytes in EMES/EC and EMES/DMC, as described in Example 6. A constant current density of 0.14 mA/cm$^2$ was used for both charging and discharging with pre-set cut-off voltage of 0.01~2.0V for Li ∥ electrolyte ∥ graphite cell and 2.5~4.2V for graphite ∥ electrolyte ∥ LiCoO$_2$ cell, respectively. The results are shown in FIGS. 12 and 13. There is no graphite exfoliations observed in all the cases studied under the charge/discharge current density of 0.14 mA cm$^{-2}$.

In Example 8, involving characterization of EMES with additives, ethylene sulfite (ES) is chosen as an additive and mixed with EMES at the composition of 5 wt %. 1.0M LiClO$_4$ electrolyte was prepared by dissolving the salt in the mixture of EMES/ES at about 80° C., as described in Example 3. The ionic conductivities were measured using the method described in Example 3 and its temperature dependence curve shown in FIGS. 9a-9b is higher than that of 1.0M LiPF$_6$/EMES solution.

Figure 14:
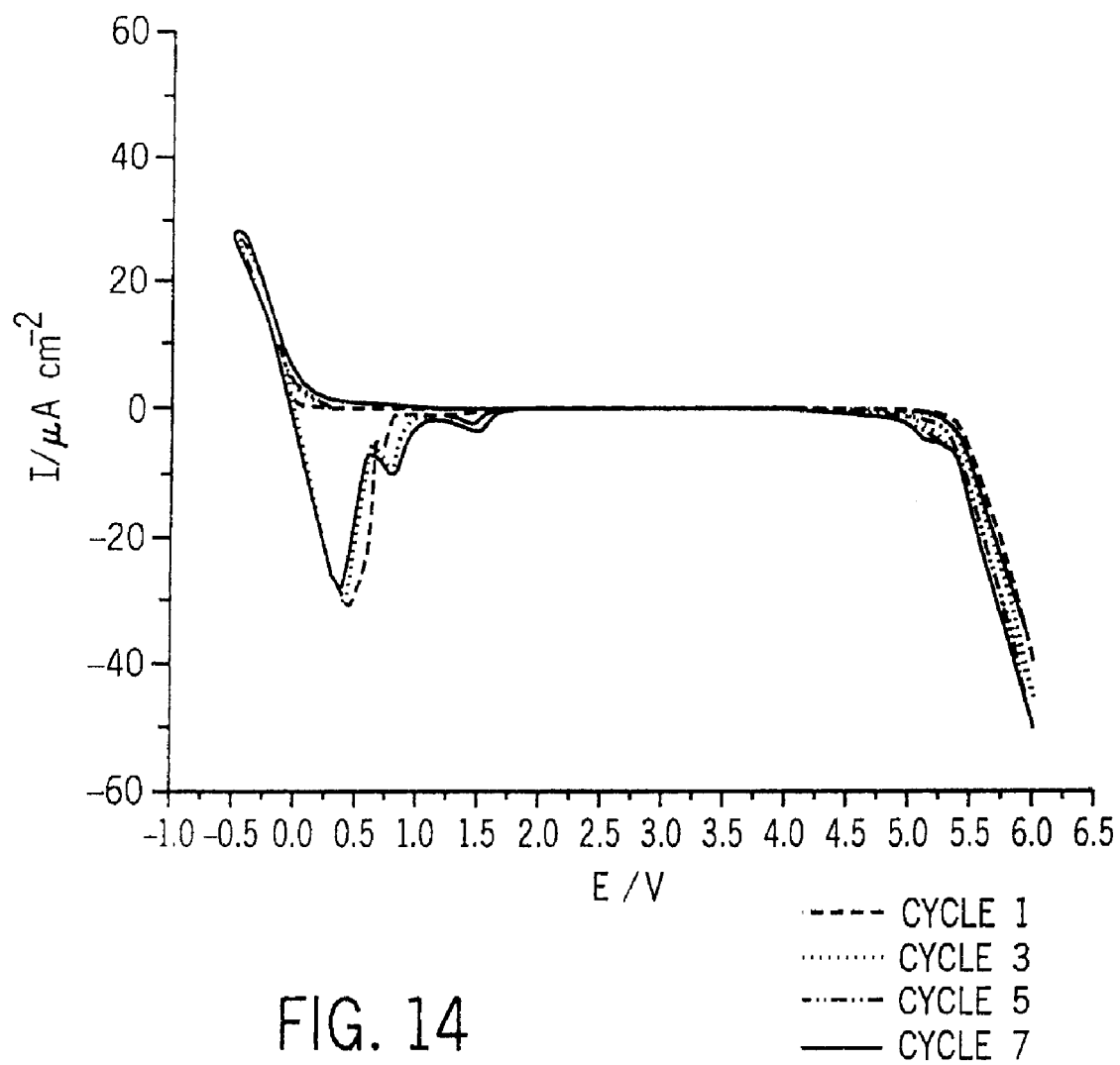
FIG. 14 is a graph of an electrochemical window for 1M LiClO$_4$ in EMES/ES mixture.

The cyclic voltammograms of 1M LiClO$_4$ in EMES/ES was measured, as described in Example 5, which is shown in FIG. 14. The electrochemical stability is still higher than 5.0v.

Half cell of Li ∥ electrolyte ∥ graphite or full cell of graphite ∥ electrolyte LiCoO$_2$ were built using the 1M LiCl$_4$ electrolytes in EMES/ES, as described in Example 6. A constant current density of 0.14 mA/cm² was used for both charging and discharging with pre-set cut-off voltage of 0.01~2.0V for Li || electrolyte || graphite cell and 2.5~4.2V for graphite || electrolyte || LiCoO₂ cell, respectively. The results are shown in FIGS. 12 and 13. Note that there is no graphite exfoliations observed in this case studied under the charge/discharge current density of 0.14 mA cm⁻².

In Example 9, involving synthesis of ethyl methoxyethoxyethyl sulfone (EMEES), 40 g NaOH was dissolved in 40 g H₂O and cooled with ice water. 62 g ethanethiol was added to the solution slowly. The solution is stirred for half hour before 138.5 g chloroethyl methoxyethyl ether (ClCH₂CH₂OCH₂CH₂OCH₃) was added. After addition the solution was stirred at room temperature for several hours before it was heated to reflux for overnight. The reaction was stopped and cooled to room temperature. Ethyl methoxyethoxyethyl sulfide (CH₃CH₂SCH₂CH₂OCH₂CH₂OCH₃) in the upper organic layer was separated with a yield of 96%. The resulting compound was oxidized with H₂O₂ and acetic acid, as described in Example 1, to yield ethy methoxyethoxyethyl sulfone (EMEES).

In Example 10, involving characterization of ethyl methoxyethoxyethyl sulfone (EMEES), the $T_g$ of EMEES is −87.6° C. as shown in Table 1. Salt solutions of EMEES were prepared, as described in Example 3, and their ionic conductivities were measured using the method described in Example 3. The temperature dependence curve for EMEES containing 1.0M LiTFSI is shown in FIG. 3. The $T_g$ and room temperature ionic conductivities of 1.0M of different lithium salts in EMEES are shown in Table 2. The cyclic voltammogram of 1M LiTFSI/EMEES electrolyte was measured, as described in Example 5, which is shown in FIG. 4b.

In Example 11, involving synthesis of ethyl methoxyethoxyethoxyethyl sulfone (EMEEES), 40 g NaOH was dissolved in 40 g H₂O and cooled with ice water, 62 g ethanethiol was added to the solution slowly. The solution was stirred for half hour before 182.5 g chloroethyl methoxyethoxyethyl ether (ClCH₂CH₂OCH₂CH₂OCH₂CH₂OCH₃) was added. After addition the solution was stirred at room temperature for several hours before it was heated to reflux for overnight. The reaction was stopped and cooled to room temperature. Ethyl methoxyethoxyethoxyethyl sulfide (CH₃CH₂SCH₂CH₂OCH₂CH₂OCH₂CH₂OCH₃) in the upper organic layer was separated with a yield of 95%. The sulfide was further oxidized with H₂O₂ and acetic acid, as described in Example 1, to obtain the ethyl methoxyethoxyethoxyethyl sulfone (EMEEES).

In Example 12, involving characterization of ethyl methoxyethoxyethoxyethyl sulfone (EMEEES), the $T_g$ of EMEEES is −82.5° C., as shown in Table 1. Salt solutions of EMEEES were prepared, as described in Example 3, and their ionic conductivities were measured using the method described in Example 3. The temperature dependence curve for EMEEES containing 1.0M LiTFSI is shown in FIG. 3. The $T_g$ and room temperature ionic conductivities of 1.0M of different lithium salts in EMEEES are shown in Table 2.

In Example 13, involving synthesis of dimethoxyethyl sulfone (DMES), 50 ml 2-chloroethyl methyl ether, 70 g Na₂S.9H₂O, 17.6 g tetrabutylammonium bromide and 50 ml H₂O were mixed into a three-neck flask equipped with magnetic stirrer and reflux condenser, and heated at 70° C. with vigorous stirring. The reaction was continued for overnight. The organic layer was separated and dissolved in chloroform, washed with distilled water several times to remove the ammonium salt and dried over anhydrous sodium sulfate. Solvent was removed using a rotary evaporator, and dimethoxyethyl sulfide was obtained with a yield of 63%. The sulfide was oxidized with H₂O₂ and acetic acid, as described in Example 1, to obtain the corresponding sulfone, dimethoxyethylsulfone (DMES).

In Example 14, involving characterization of dimethoxyethyl sulfone (DMES), the $T_g$ and $T_m$ of DMES are −90.7° C. and 47.0° C., respectively, as shown in Table 1. Salt solutions of DMES were prepared, as described in Example 3, and their ionic conductivities were measured using the method described in Example 3. The temperature dependence curve for DMES containing 1.0M LiTFSI is shown in FIG. 3. The $T_g$ and room temperature ionic conductivities of 1.0M of different lithium salts in DMES are shown in Table 2.

Implementations of features described in this specification can be used to provide high oxidation resistance and high conductivity. This combination of high oxidation resistance and high conductivity can be used to provide, among other things, burn-resistant, combustion-resistant electrolytic cells. Moreover, great attention has recently been given to the difficulty of producing highly conductive, flame retardant methods and devices for electric current generation. When a sulfone as described in this specification is utilized as a solvent to dissolve inorganic electrolyte salts of highly oxidation resistant anions such as ClO₄, CF₃SO₃ (triflate), and in particular, bis(trifluoromethane sulfonyl) imide(—N(CF₃SO₂)₂, lithium imide), solutions can be obtained to provide both high oxidation resistance and high ambient temperature conductivity. This resistance to oxidation inhibits energy producing chemical reactions such as those that might cause explosion or flame. The result of this inhibition is the increased stability which can be important in high energy or high temperature batteries.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications and enhancements to the described examples and implementations and other implementations may be made based on what is disclosed.

What is claimed is:

1. An electrolyte element for use in an electric current-producing device, comprising:
    one or more ionic electrolyte salts; and
    a non-aqueous electrolyte solvent including one or more non-symmetrical, non-cyclic sulfones of the general formula: R1—SO2—R2, wherein the R1 group is a linear or branched alkyl or partially or fully fluorinated linear or branched alkyl group having 1 to 7 carbon atoms, and the R2 group, which is different in formulation than the R1 group, is a linear or branched or partially or fully fluorinated linear or branched oxygen containing alkyl group having 1 to 7 carbon atoms.

2. The electrolyte element of claim 1, wherein the R1 group comprises at least one of:

methyl (—$CH_3$); ethyl (—$CH_2CH_3$); n-propyl (—$CH_2CH_2CH_3$); n-butyl (—$CH_2CH_2CH_2CH_3$); n pentyl (—$CH_2CH_2CH_2CH_2CH_3$); n-hexyl (—$CH_2CH_2CH_2CH_2CH_2CH_3$); n-heptyl (—$CH_2CH_2CH_2CH_2CH_2CH_2CH_3$); iso-propyl (—$CH(CH_3)_2$); iso-butyl (—$CH_2CH(CH_3)_2$); sec-butyl (—$CH(CH_3)CH_2CH_3$); tert-butyl (—$C(CH_3)_3$); iso-pentyl (—$CH_2CH_2CH(CH_3)_2$); trifluoromethyl (—$CF_3$);2,2,2-trifluoroethyl (—$CH_2CF_3$);1,1-difluoroethyl (—$CF_2CH_3$); perfluoroethyl (—$CF_2CF_3$); 3,3,3-trifluoro-n-propyl (—$CH_2CH_2CF_3$);2,2-difluoro-npropyl (—$CH_2CF_2CH_3$);1,1-difluoro-n-propyl (—$CF_2CH_2CH_3$);1,1,3,3,3-pentafluoro-n-propyl (—$CF_2CH_2CF_3$); 2,2,3,3,3-pentafluoro-n-propyl (—$CH_2CF_2CF_3$); perfluoro-n-propyl (—$CF_2CF_2CF_3$); perfluoro-n-butyl (—$CF_2CF_2CF_2CF_3$); perfluoro-npentyl (—$CF_2CF_2CF_2CF_2CF_3$); perfluoro-n-hexyl (—$CF_2CF_2CF_2CF_2CF_2CF_3$); perfluoro-n-heptyl (—$CF_2CF_2CF_2CF_2CF_2CF_2CF_3$);—$CF(CH_3)_2$;—$CH(CH_3)CF_3$;—$CF(CF_3)_2$;—$CH(CF_3)_2$; —$CH_2CF(CH_3)_2$;—$CF_2CH(CH_3)_2$;—$CH_2CH(CH_3)CF_3$;—$CH_2CH(CF_3)_2$;—$CF_2CF(CF_3)_2$;—$C(CF_3)_3$.

3. The electrolyte element of claim 1, wherein the R2 group comprises at least one of —$CH_2OCH_3$;—$CF_2OCH_3$;—$CF_2OCF_3$;—$CH_2CH_2OCH_3$;—$CH_2CF_2OCH_3$;—$CF_2CH_2OCH_3$; —$CF_2CF_2OCH_3$;—$CF_2CF_2OCF_3$;—$CF_2CH_2OCF_3$;—$CH_2CH_2OCF_3$;—$CH_2CF_2OCF_3$; —CHF$CF_2OCF_2$H;—$CF_2CF_2OCF(CF_3)_2$;—$CF_2CH_2OCF(CF_3)_2$;—$CH_2CF_2OCF(CF_3)_2$; —$CH_2CH_2OCF(CF_3)_2$;—$CF_2CF_2OC(CF_3)_3$;—$CF_2CH_2OC(CF_3)_3$;—$CH_2CF_2OC(CF_3)_3$; —$CH_2CH_2OC(CF_3)_3$;—$CH_2CH_2OCH_2CH_3$;—$CH_2CH_2OCH_2CF_3$;—$CH_2CH_2OCF_2CH_3$;—$CH_2CH_2OCF_2CF_3$;—$CH_2CF_2OCH_2CH_3$;—$CH_2CF_2OCH_2CF_3$; —$CH_2CF_2OCF_2CH_3$;—$CH_2CF_2OCF_2CF_3$;—$CF_2CH_2OCH_2CH_3$;—$CF_2CH_2OCH_2CF_3$;—$CF_2CH_2OCF_2CH_3$;—$CF_2CH_2OCF_2CF_3$;—$CF_2CF_2OCH_2CH_3$;—$CF_2CF_2OCH_2CF_3$;—$CF_2CF_2OCF_2CH_3$;—$CF_2CF_2OCF_2CF_3$;—$CF_2CF_2CF_2OCH_3$;—$CF_2CF_2CH_2OCH_3$;—$CF_2CH_2CF_2OCH_3$;—$CH_2CF_2CF_2OCH_3$;—$CF_2CH_2CF_2OCH_3$;—$CH_2CF_2CF_2OCH_3$;—$CH_2CF_2CH_2OCH_3$;—$CH_2CH_2CF_2OCH_3$;—$CH_2CH_2CH_2OCH_3$;—$CF_2CF_2CF_2OCF_3$;—$CF_2CF_2CH_2OCF_3$;—$CF_2CH_2CF_2OCF_3$;—$CH_2CF_2CF_2OCF_3$;—$CH_2CF_2CH_2OCF_3$;—$CH_2CH_2CF_2OCF_3$;—$CH_2CH_2CH_2OCF_3$;—$CF_2CH_2CH_2OCF_3$;—$CH_2CH_2CH_2CH_2OCH_3$;—$CH_2CH_2CH_2CH_2CH_2OCH_3$;—$CH_2CH_2CH_2CH_2CH_2CH_2OCH_3$;—$CH_2CH_2OCH_2CH_2OCH_3$;—$CH_2CH_2OCH_2CH_2OCH_2CH_2OCH_3$.

4. The electrolyte element of claim 1, wherein the ionic electrolyte salt comprises at least one of $MClO_4$, $MPF_6$, $MPF_x(C_nF_{2n+1})_{6-x}$, $MBF_4$, $MBF_{4-x}(C_nF_{2n+1})_x$, $MAsF_6$, MSCN, $MB(CO_2)_4$, $MN(SO_2CF_3)_2$, and $MSO_3CF_3$, where "M" is lithium or sodium, or any mixture thereof.

5. The electrolyte element of claim 1, comprising an electrolyte co-solvent.

6. The electrolyte element of claim 5, wherein the electrolyte co-solvent comprises at least one of co-solvents including carbonates, N-methyl acetamide, acetonitrile, symmetric sulfones, sulfolanes, 1,3-dioxolanes, glymes, polyethylene glycols, siloxanes, and ethylene oxide grafted siloxanes.

7. The electrolyte element of claim 1, comprising an electrolyte additive.

8. The electrolyte element of claim 7, wherein the electrolyte additive comprises at least one of: vinylene carbonate (VC), ethylene sulfite (ES), propylene sulfite (PS), fluoroethylene sulfite (FEC), α-bromo-γ-butyrolactone, methyl chloroformate, t-butylene carbonate, 12-crown-4, carbon dioxide ($CO_2$), sulfur dioxide ($SO_2$), sulfur trioxide ($SO_3$), acid anhydrides, reaction products of carbon disulfide and lithium, polysulfide, and other inorganic additives.

9. An electric current-producing device, comprising:
a cathode;
an anode; and
a non-aqueous electrolyte element disposed between the cathode and anode, the non-aqueous electrolyte element including an electrolyte salt and a non-symmetrical, noncyclic sulfone of the general formula: R1—SO2—R2, wherein R1 is an alkyl group, and R2 is an alkyl group including oxygen.

10. The electric current-producing device of claim 9, wherein the device is a voltaic cell.

11. The electric current-producing device of claim 9, wherein the device is a supercapacitor.

12. The electric current-producing device of claim 9, wherein the alkyl group of R1 includes oxygen and has a different formulation than R2.

13. The electric current-producing device of claim 12, wherein the R1 or R2 group comprises at least one of: —$CH_2OCH_3$;—$CF_2OCH_3$;—$CF_2OCF_3$;—$CH_2CH_2OCH_3$;—$CH_2CF_2OCH_3$;—$CF_2CH_2OCH_3$;—$CF_2CF_2OCH_3$;—$CF_2CF_2OCF_3$;—$CF_2CH_2OCF_3$;—$CH_2CF_2OCF_3$;—$CH_2CH_2OCF_3$; —CHF$CF_2OCF_2$H;—$CF_2CF_2OCF(CF_3)_2$;—$CF_2CH_2OCF(CF_3)_2$;—$CH_2CF_2OCF(CF_3)_2$;—$CH_2CH_2OCF(CF_3)_2$;—$CF_2CF_2OC(CF_3)_3$;—$CF_2CH_2OC(CF_3)_3$;—$CH_2CF_2OC(CF_3)_3$;—$CH_2CH_2OC(CF_3)_3$;—$CH_2CH_2OCH_2CH_3$;—$CH_2CH_2OCH_2CF_3$;—$CH_2CH_2OCF_2CH_3$;—$CH_2CH_2OCF_2CF_3$;—$CH_2CF_2OCH_2CH_3$;—$CH_2CF_2OCH_2CF_3$;—$CH_2CF_2OCF_2CH_3$;—$CH_2CF_2OCF_2CF_3$;—$CF_2CH_2OCH_2CH_3$;—$CF_2CH_2OCH_2CF_3$;—$CF_2CH_2OCF_2CH_3$;—$CF_2CH_2OCF_2CF_3$;—$CF_2CF_2OCH_2CH_3$;—$CF_2CF_2OCH_2CF_3$;—$CF_2CF_2OCF_2CH_3$;—$CF_2CF_2OCF_2CF_3$;—$CF_2CF_2CF_2OCH_3$;—$CF_2CF_2CH_2OCH_3$;—$CF_2CH_2CF_2OCH_3$;—$CH_2CF_2CF_2OCH_3$;—$CH_2CF_2CH_2OCH_3$;—$CH_2CH_2CF_2OCH_3$;—$CH_2CH_2CH_2OCH_3$;—$CF_2CF_2CF_2OCF_3$;—$CF_2CF_2CH_2OCF_3$;—$CF_2CH_2CF_2OCF_3$;—$CH_2CF_2CF_2OCF_3$;—$CH_2CF_2CH_2OCF_3$;—$CH_2CH_2CF_2OCF_3$;—$CH_2CH_2CH_2OCF_3$;—$CH_2CH_2CH_2OCH_3$;—$CH_2CH_2CH_2CH_2OCH_3$;—$CH_2CH_2CH_2CH_2CH_2OCH_3$;—$CH_2CH_2CH_2CH_2CH_2CH_2OCH_3$;—$CH_2CH_2OCH_2CH_2OCH_3$;—$CH_2CH_2OCH_2CH_2OCH_2CH_2OCH_3$.

14. The electric current-producing device of claim 9, wherein the R1 group comprises at least one of: methyl (—$CH_3$); ethyl (—$CH_2CH_3$); n-propyl (—$CH_2CH_2CH_3$); n-butyl (—$CH_2CH_2CH_2CH_3$); n-pentyl (—$CH_2CH_2CH_2CH_2CH_3$); n-hexyl (—$CH_2CH_2CH_2CH_2CH_2CH_3$); n-heptyl (—$CH_2CH_2CH_2CH_2CH_2CH_2CH_3$); iso-propyl (—$CH(CH_3)_2$); iso-butyl (—$CH_2CH(CH_3)_2$); sec-butyl (—$CH(CH_3)CH_2CH_3$); tert-butyl (—$C(CH_3)_3$); iso-pentyl (—$CH_2CH_2CH(CH_3)_2$); trifluoromethyl (—$CF_3$);2,2,2-trifluoroethyl (—$CH_2CF_3$);1,1-difluoroethyl (—$CF_2CH_3$); perfluoroethyl (—$CF_2CF_3$);3,3,3-trifluoro-n-propyl (—$CH_2CH_2CF_3$);2,2-difluoro-n-propyl (—$CH_2CF_2CH_3$);1,1-difluoro-n-propyl (—$CF_2CH_2CH_3$);1,1,3,3,3-pentafluoro-n-propyl (—$CF_2CH_2CF_3$);2,2,3,3,3-pentafluoro-n-propyl (—$CH_2CF_2CF_3$); perfluoro-n-propyl (—$CF_2CF_2CF_3$); perfluoro-n-butyl (—$CF_2CF_2CF_2CF_3$); perfluoro-n-pentyl (—CF$_2$CF$_2$CF$_2$CF$_2$CF$_3$); perfluoro-n-hexyl (—CF$_2$CF$_2$CF$_2$CF$_2$CF$_2$CF$_3$); perfluoro-n-heptyl (—CF$_2$CF$_2$CF$_2$CF$_2$CF$_2$CF$_2$CF$_3$);—CF(CH$_3$)$_2$; —CH(CH$_3$) CF$_3$;—CF(CF$_3$)$_2$;—CH(CF$_3$)$_2$;—CH$_2$CF(CH$_3$)$_2$;—CF$_2$CH (CH$_3$)$_2$;—CH$_2$CH(CH$_3$)CF$_3$; —CH$_2$CH(CF$_3$)$_2$;—CF$_2$CF (CF$_3$)$_2$;—C(CF$_3$)$_3$.

15. The electric current-producing device of claim 9, wherein the ionic electrolyte salt comprises at least one of MClO$_4$, MPF$_6$, MPF$_X$(C$_n$F$_{2n+}$)$_{6-X}$, MBF$_4$, MBF$_{4-X}$ (C$_n$F$_{2n+1}$)$_X$, MAsF$_6$, MSCN, MB(CO$_2$)$_4$, MN(SO$_2$CF$_3$)$_2$, and MSO$_3$CF$_3$, where "M" is lithium or sodium, or any mixture thereof.

16. The electric current-producing device of claim 9, wherein the electrolyte element includes an electrolyte co-solvent.

17. The electric current-producing device of claim 16, wherein the electrolyte co-solvent comprises at least one of: co-solvents including carbonates, N-methyl acetamide, acetonitrile, symmetric sulfones, sulfolanes, 1,3-dioxolanes, glymes, polyethylene glycols, siloxanes, and ethylene oxide grafted siloxanes.

18. The electric current-producing device of claim 9, wherein the electrolyte element further includes an electrolyte additive, and other inorganic additives.

19. The electric current-producing device of claim 18, wherein the electrolyte additive comprises at least one of: vinylene carbonate (VC), ethylene sulfite (ES), propylene sulfite (PS), fluoroethylene sulfite (FEC), α-bromo-γ-butyrolactone, methyl chloroformate, t-butylene carbonate, 12-crown-4, carbon dioxide (CO$_2$), sulfur dioxide (SO$_2$), sulfur trioxide (SO$_3$), acid anhydrides, reaction products of carbon disulfide and lithium, polysulfide, and other inorganic additives.

20. An electrolyte for an electric current-producing device, comprising a non-aqueous electrolyte solvent including an non-symmetrical, non-cyclic sulfone of the general formula: R1—SO2—R2, wherein R1 is an alkyl group, and R2 is an alkyl group including oxygen.

21. The electrolyte of claim 20, wherein the alkyl group of R1 includes oxygen and has a different formulation than R2.

22. The electrolyte of claim 21, wherein the R1 or R2 group comprises at least one of: —CH$_2$OCH$_3$;—CF$_2$OCH$_3$;—CF$_2$OCF$_3$;—CH$_2$CH$_2$OCH$_3$; —CH$_2$CF$_2$OCH$_3$;—CF$_2$CH$_2$OCH$_3$; —CF$_2$CF$_2$OCH$_3$;—CF$_2$CF$_2$OCF$_3$;—CF$_2$CH$_2$OCF$_3$;—CH$_2$CF$_2$OCF$_3$;—CH$_2$CH$_2$OCF$_3$; —CHFCF$_2$OCF$_2$H;—CF$_2$CF$_2$OCF(CF$_3$)$_2$;—CF$_2$CH$_2$OCF (CF$_3$)$_2$;—CH$_2$CF$_2$OCF(CF$_3$)$_2$; —CH$_2$CH$_2$OCF(CF$_3$)$_2$;—CF$_2$CF$_2$OC(CF$_3$)$_3$; —CF$_2$CH$_2$OC(CF$_3$)$_3$;—CH$_2$CF$_2$OC (CF$_3$)$_3$; —CH$_2$CH$_2$OC(CF$_3$)$_3$;—CH$_2$CH$_2$OCH$_2$CH$_3$;—CH$_2$CH$_2$OCH$_2$CF$_3$;—CH$_2$CH$_2$OCF$_2$CH$_3$; —CH$_2$CH$_2$OCF$_2$CF$_3$;—CH$_2$CF$_2$OCH$_2$CH$_3$;—CH$_2$CF$_2$OCF$_2$CH$_3$;—CH$_2$CF$_2$OCH$_2$CF$_3$; —CH$_2$CF$_2$OCF$_2$CF$_3$;—CF$_2$CH$_2$OCH$_2$CH$_3$;—CF$_2$CH$_2$OCF$_2$CH$_3$;—CF$_2$CH$_2$OCH$_2$CF$_3$; —CF$_2$CH$_2$OCF$_2$CF$_3$;—CF$_2$CF$_2$OCH$_2$CH$_3$;—CF$_2$CF$_2$OCF$_2$CH$_3$;—CF$_2$CF$_2$OCH$_2$CF$_3$; —CF$_2$CF$_2$OCF$_2$CF$_3$;—CF$_2$CF$_2$CF$_2$OCH$_3$;—CF$_2$CF$_2$CH$_2$OCH$_3$;—CF$_2$CH$_2$CF$_2$OCH$_3$;—CH$_2$CF$_2$CF$_2$OCH$_3$;—CH$_2$CF$_2$CH$_2$OCH$_3$;—CH$_2$CH$_2$CF$_2$OCH$_3$;—CF$_2$CH$_2$CH$_2$OCH$_3$;—CH$_2$CH$_2$CH$_2$OCH$_3$;—CF$_2$CF$_2$CF$_2$OCF$_3$;—CF$_2$CF$_2$CH$_2$OCF$_3$;—CF$_2$CH$_2$CF$_2$OCF$_3$;—CH$_2$CF$_2$CF$_2$OCF$_3$;—CH$_2$CF$_2$CH$_2$OCF$_3$;—CH$_2$CH$_2$CF$_2$OCF$_3$;—CF$_2$CH$_2$CH$_2$OCF$_3$;—CH$_2$CH$_2$CH$_2$OCF$_3$;—CH$_2$CH$_2$CH$_2$CH$_2$OCH$_3$;—CH$_2$CH$_2$CH$_2$CH$_2$OCH$_3$;—CH$_2$CH$_2$CH$_2$CH$_2$CH$_2$OCH$_3$;—CH$_2$CH$_2$OCH$_2$CH$_2$OCH$_3$;—CH$_2$CH$_2$OCH$_2$CH$_2$OCH$_2$CH$_2$OCH$_3$.

23. The electrolyte of claim 21, wherein the R1 group comprises at least one of: methyl (—CH$_3$); ethyl (—CH$_2$CH$_3$); n-propyl (—CH$_2$CH$_2$CH$_3$); n-butyl (—CH$_2$CH$_2$CH$_2$CH$_3$); n-pentyl (—CH$_2$CH$_2$CH$_2$CH$_2$CH$_3$); n-hexyl (—CH$_2$CH$_2$CH$_2$CH$_2$CH$_2$CH$_3$); n-heptyl (—CH$_2$CH$_2$CH$_2$CH$_2$CH$_2$CH$_2$CH$_3$); iso-propyl (—CH(CH$_3$)$_2$); iso-butyl (—CH$_2$CH(CH$_3$)$_2$); sec-butyl (—CH(CH$_3$)CH$_2$CH$_3$); tert-butyl (—C(CH$_3$)$_3$); iso-pentyl (—CH$_2$CH$_2$CH(CH$_3$)$_2$); trifluoromethyl (—CF$_3$);2,2,2-trifluoroethyl (—CH$_2$CF$_3$);1,1-difluoroethyl (—CF$_2$ CH$_3$); perfluoroethyl (—CF$_2$ CF$_3$); 3,3,3-trifluoro-n-propyl (—CH$_2$CH$_2$CF$_3$);2,2-difluoro-n-propyl (—CH$_2$ CF$_2$ CH$_3$);1,1-difluoro-n-propyl (—CF$_2$ CH$_2$ CH$_3$);1,1,3,3,3-pentafluoro-n-propyl (—CF$_2$ CH$_2$ CF$_3$);2,2,3,3,3-pentafluoro-n-propyl (—CH$_2$CF$_2$CF$_3$); perfluoro-n-propyl (—CF$_2$CF$_2$CF$_3$); perfluoro-n-butyl (—CF$_2$CF$_2$CF$_2$CF$_3$); perfluoro-n-pentyl (—CF$_2$CF$_2$CF$_2$CF$_2$CF$_3$); perfluoro-n-hexyl (—CF$_2$CF$_2$CF$_2$CF$_2$CF$_2$CF$_3$); perfluoro-n-heptyl (—CF$_2$CF$_2$CF$_2$CF$_2$CF$_2$CF$_2$CF$_3$); —CF(CH$_3$)$_2$;—CH(CH$_3$) CF$_3$;—CF(CF$_3$)$_2$; —CH(CF$_3$)$_2$;—CH$_2$CF(CH$_3$)$_2$;—CF$_2$CH (CH$_3$)$_2$;—CH$_2$CH(—CH$_3$)CF$_3$;—CH$_2$CH(CF$_3$)$_2$;—CF$_2$CF (CF$_3$)$_2$; —C(CF$_3$)$_3$.

24. The electrolyte of claim 20, wherein the ionic electrolyte salt comprises at least one of MClO$_4$, MPF$_6$, MPF$_X$ (C$_n$F$_{2n+1}$)$_{6-X}$, MBF$_4$, MBF$_{4-X}$(C$_n$F$_{2n+1}$)$_X$, MAsF$_6$, MSCN, MB(CO$_2$)$_4$, MN(SO$_2$CF$_3$)$_2$, and MSO$_3$CF$_3$, where "M" is lithium or sodium, or any mixture thereof.

25. The electrolyte of claim 21, further including an electrolyte co-solvent.

26. The electrolyte of claim 25, wherein the electrolyte cosolvent comprises at least one of co-solvents including carbonates, N-methyl acetamide, acetonitrile, symmetric sulfones, sulfolanes, 1,3-dioxolanes, glymes, polyethylene glycols, siloxanes, and ethylene oxide grafted siloxanes.

27. The electrolyte of claim 20, further including an electrolyte additive.

28. The electrolyte of claim 27, wherein the electrolyte additive comprises at least one of vinylene carbonate (VC), ethylene sulfite (ES), propylene sulfite (PS), fluoroethylene sulfite (FEC), α-bromo-γ-butyrolactone, methyl chloroformate, t-butylene carbonate,12-crown-4, carbon dioxide (CO$_2$), sulfur dioxide (SO$_2$), sulfur trioxide (SO$_3$), acid anhydrides, reaction products of carbon disulfide and lithium, polysulfide, and other inorganic additives.

29. A method of forming an electric current-producing device, comprising:
providing a cathode;
providing an anode; and
providing a non-aqueous electrolyte element disposed between the cathode and anode, the non-aqueous electrolyte element including an electrolyte salt and a non-symmetrical, non-cyclic sulfone of the general formula: R1—SO2—R2, wherein R1 is an alkyl group, and R2 is an alkyl group including oxygen.

30. The method of claim 29, wherein the alkyl group of R1 includes oxygen and has a different formulation than R2.

31. The method of claim 30, wherein the R1 or R2 group comprises at least one of: —CH$_2$OCH$_3$;—CF$_2$OCH$_3$;—CF$_2$OCF$_3$;—CH$_2$CH$_2$OCH$_3$;—CH$_2$CF$_2$OCH$_3$;—CF$_2$CH$_2$OCH$_3$; —CF$_2$CF$_2$OCH$_3$;—CF$_2$CF$_2$OCF$_3$;—CF$_2$CH$_2$OCF$_3$;—CH$_2$CF$_2$OCF$_3$;—CH$_2$CH$_2$OCF$_3$; —CHFCF$_2$OCF$_2$H;—CF$_2$CF$_2$OCF(CF$_3$)$_2$;—CF$_2$CH$_2$OCF (CF$_3$)$_2$;—CH$_2$CF$_2$OCF(CF$_3$)$_2$; —CH$_2$CH$_2$OCF(CF$_3$)$_2$;—CF$_2$CF$_2$OC(CF$_3$)$_3$; —CF$_2$CH$_2$OC(CF$_3$)$_3$;—CH$_2$CF$_2$OC (CF$_3$)$_3$; —CH$_2$CH$_2$OC(CF$_3$)$_3$;—CH$_2$CH$_2$OCH$_2$CH$_3$;—

$CH_2CH_2OCH_2CF_3$;—$CH_2CH_2OCF_2CH_3$;—$CH_2CH_2OCF_2CF_3$;—$CH_2CF_2OCH_2CH_3$;—$CH_2CF_2OCF_2CH_3$;—$CH_2CF_2OCH_2CF_3$;—$CH_2CF_2OCF_2CF_3$;—$CF_2CH_2OCH_2CH_3$;—$CF_2CH_2OCF_2CH_3$;—$CF_2CH_2OCH_2CF_3$;—$CF_2CH_2OCF_2CF_3$;—$CF_2CF_2OCH_2CH_3$;—$CF_2CF_2OCF_2CH_3$;—$CF_2CF_2OCH_2CF_3$;—$CF_2CF_2OCF_2CF_3$;—$CF_2CF_2CF_2OCH_3$;—$CF_2CF_2CH_2OCH_3$;—$CF_2CH_2CF_2OCH_3$;—$CH_2CF_2CF_2OCH_3$;—$CH_2CF_2CH_2OCH_3$;—$CH_2CH_2CF_2OCH_3$;—$CF_2CH_2CH_2OCH_3$;—$CH_2CH_2CH_2OCH_3$;—$CF_2CF_2CF_2OCF_3$;—$CF_2CF_2CH_2OCF_3$;—$CF_2CH_2CF_2OCF_3$;—$CH_2CF_2CF_2OCF_3$;—$CH_2CH_2CF_2OCF_3$;—$CH_2CF_2CH_2OCF_3$;—$CF_2CH_2CH_2OCF_3$;—$CH_2CH_2CH_2CH_2OCH_3$;—$CH_2CH_2CH_2CH_2CH_2OCH_3$;—$CH_2CH_2CH_2CH_2CH_2CH_2OCH_3$;—$CH_2CH_2OCH_2CH_2OCH_3$;—$CH_2CH_2OCH_2CH_2OCH_2CH_2OCH_3$.

32. The method of claim 29, wherein the R1 group comprises at least one of: methyl (—$CH_3$); ethyl (—$CH_2CH_3$); n-propyl (—$CH_2CH_2CH_3$); n-butyl (—$CH_2CH_2CH_2CH_3$); n-pentyl (—$CH_2CH_2CH_2CH_2CH_3$); n-hexyl (—$CH_2CH_2CH_2CH_2CH_2CH_3$); n-heptyl (—$CH_2CH_2CH_2CH_2CH_2CH_2CH_3$); iso-propyl (—$CH(CH_3)_2$); iso-butyl (—$CH_2CH(CH_3)_2$); sec-butyl (—$CH(CH_3)CH_2CH_3$); tert-butyl (—$C(CH_3)_3$); iso-pentyl (—$CH_2CH_2CH(CH_3)_2$); trifluoromethyl (—$CF_3$); 2,2,2-trifluoroethyl (—$CH_2CF_3$); 1,1-difluoroethyl (—$CF_2CH_3$); perfluoroethyl (—$CF_2CF_3$); 3,3,3-trifluoro-n-propyl (—$CH_2CH_2CF_3$); 2,2-difluoro-n-propyl (-$CH_2 CF_2 CH_3$); 1,1-difluoro-n-propyl (—$CF_2 CH_2 CH_3$); 1,1,3,3,3-pentafluoro-n-propyl (—$CF_2 CH_2 CF_3$); 2,2,3,3,3-pentafluoro-n-propyl (—$CH_2CF_2CF_3$); perfluoro-n-propyl (—$CF_2CF_2CF_3$); perfluoro-n-butyl (—$CF_2CF_2CF_2CF_3$); perfluoro-n-pentyl (—$CF_2CF_2CF_2CF_2CF_3$); perfluoro-n-hexyl (—$CF_2CF_2CF_2CF_2CF_2CF_3$); perfluoro-n-heptyl (—$CF_2CF_2CF_2CF_2CF_2CF_2CF_3$);—$CF(CH_3)_2$;—$CH(CH_3)CF_3$;—$CF(CF_3)_2$; —$CH(CF_3)_2$;—$CH_2CF(CH_3)_2$;—$CF_2CH(CH_3)_2$;—$CH_2CH(CH_3)CF_3$;—$CH_2CH(CF_3)_2$;—$CF_2CF(CF_3)_2$; —$C(CF_3)_3$.

* * * * *

UNITED STATES PATENT AND TRADEMARK OFFICE
CERTIFICATE OF CORRECTION

PATENT NO. : 7,833,666 B2  
APPLICATION NO. : 11/780416  
DATED : November 16, 2010  
INVENTOR(S) : Charles Austen Angell et al.

Page 1 of 2

It is certified that error appears in the above-identified patent and that said Letters Patent is hereby corrected as shown below:

On the title page item (73), line 2, before "behalf" insert -- on --, therefore.

In claim 2, page 3, column 17, lines 7-8, delete "n pentyl" and insert -- n-pentyl --, therefor.

In claim 2, page 3, column 17, line 16 (approx.), delete "npropyl" and insert -- n-propyl --, therefor.

In claim 2, page 3, column 17, line 17 (approx.), delete "(—$CH_2CF_2$ $CH_3$);" and insert -- (—$CH_2CF_2CH_3$); --, therefor.

In claim 2, page 3, column 17, lines 17-18 (approx.), delete "(—$CF_2$ $CH_2$ $CH_3$);" and insert -- (—$CF_2CH_2CH_3$); --, therefor.

In claim 2, page 3, column 17, line 18 (approx.), delete "(—$CF_2$ $CH_2$ $CF_3$);" and insert -- (—$CF_2CH_2CF_3$); --, therefor.

In claim 2, page 3, column 17, line 21, delete "npentyl" and insert -- n-pentyl --, therefor.

In claim 6, page 4, column 17, line 64, delete "one of" and insert -- one of: --, therefor.

In claim 9, page 5, column 18, line 16 (approx.), delete "noncyclic" and insert -- non-cyclic --, therefor.

In claim 13, page 6, column 18, line 49 (approx.), delete "$CH_2$ $OCH_3$;" and insert -- $CH_2OCH_3$; --, therefor.

In claim 13, page 6, column 18, line 49-50 (approx.), delete "$CH_2$ $OCH_3$;" and insert -- $CH_2OCH_3$; --, therefor.

Signed and Sealed this  
Fifteenth Day of February, 2011

David J. Kappos  
*Director of the United States Patent and Trademark Office*

CERTIFICATE OF CORRECTION (continued)
U.S. Pat. No. 7,833,666 B2

In claim 13, page 6, column 18, line 50 (approx.), delete "—$CH_2CH_2$ $OCH_2CH_2$ $OCH_3$;" and insert -- —$CH_2CH_2OCH_2CH_2OCH_3$; --, therefor.

In claim 13, page 6, column 18, line 50-51 (approx.), delete ";—$CH_2CH_2$ $OCH_2CH_2$ $CH_2CH_2$ $OCH_3$." and insert -- —$CH_2CH_2OCH_2CH_2CH_2CH_2OCH_3$. --, therefor.

In claim 14, page 6, column 18, lines 62-63 (approx.), delete "(—$CH_2$ $CH_2CF_3$);" and insert -- (—$CH_2CH_2CF_3$); --, therefor.

In claim 22, page 8, column 19, line 67, delete "$OCH_3$ ." and insert -- $OCH_3$. --, therefor.

In claim 23, page 8, column 20, line 10, delete "(—$CF_2$ $CH_3$);" and insert -- (—$CF_2CH_3$); --, therefor.

In claim 23, page 8, column 20, line 11, delete "(—$CF_2$ $CH_3$);" and insert -- (—$CF_2CH_3$); --, therefor.

In claim 23, page 8, column 20, line 12, delete "(—$CH_2$ $CF_2$ $CH_3$);" and insert -- (—$CH_2CF_2CH_3$); --, therefor.

In claim 23, page 8, column 20, line 13, delete "(—$CF_2$ $CH_2$ $CH_3$);" and insert -- (—$CF_2CH_2CH_3$); --, therefor.

In claim 23, page 8, column 20, line 14, delete "(—$CF_2$ $CH_2$ $CF_3$);" and insert -- (—$CF_2CH_2CF_3$); --, therefor.

In claim 23, page 9, column 20, line 21, delete "$CH_2CH(–CH_3)CF_3$;" and insert -- $CH_2CH(CH_3)CF_3$; --, therefor.

In claim 26, page 9, column 20, line 31 (approx.), delete "one of" and insert -- one of: --, therefor.

In claim 28, page 9, column 20, line 39, delete "one of" and insert -- one of: --, therefor.

In claim 32, page 11, column 22, line 10, delete "(-$CH_2$ $CF_2$ $CH_3$);" and insert -- (—$CH_2CF_2CH_3$); --, therefor.

In claim 32, page 11, column 22, line 11, delete "(—$CF_2$ $CH_2$ $CH_3$);" and insert -- (—$CF_2CH_2CH_3$); --, therefor.

In claim 32, page 11, column 22, line 12, delete "(—$CF_2$ $CH_2$ $CF_3$);" and insert -- (—$CF_2CH_2CF_3$); --, therefor.